United States Patent
Yamamoto et al.

(10) Patent No.: US 11,720,206 B2
(45) Date of Patent: Aug. 8, 2023

(54) TOUCH PANEL DEVICE, MEMORY EFFECT CORRECTION METHOD, AND STORAGE MEDIUM STORING MEMORY EFFECT CORRECTION PROGRAM

(71) Applicant: Mitsubishi Electric Corporation, Tokyo (JP)

(72) Inventors: Akihito Yamamoto, Tokyo (JP); Kentaro Mori, Tokyo (JP); Yuichi Sasaki, Tokyo (JP); Sohei Osawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 24 days.

(21) Appl. No.: 17/673,276

(22) Filed: Feb. 16, 2022

(65) Prior Publication Data

US 2022/0171495 A1 Jun. 2, 2022

Related U.S. Application Data

(63) Continuation of application No. PCT/JP2019/034689, filed on Sep. 4, 2019.

(51) Int. Cl.
G06F 3/041 (2006.01)

(52) U.S. Cl.
CPC ........ G06F 3/0418 (2013.01); G06F 3/04144 (2019.05)

(58) Field of Classification Search
CPC .......................... G06F 3/0418; G06F 3/04144
See application file for complete search history.

(56) References Cited

U.S. PATENT DOCUMENTS

2003/0214486 A1 11/2003 Roberts
2011/0175832 A1 7/2011 Miyazawa et al.

FOREIGN PATENT DOCUMENTS

JP 2005-526337 A 9/2005
JP 2011-170834 A 9/2011

OTHER PUBLICATIONS

International Search Report for PCT/JP2019/034689 dated Oct. 8, 2019.
Written Opinion of the International Searching Authority for PCT/JP2019/034689 (PCT/ISA/237) dated Oct. 8, 2019.

*Primary Examiner* — Towfiq Elahi
(74) *Attorney, Agent, or Firm* — Birch, Stewart, Kolasch & Birch, LLP

(57) ABSTRACT

A touch panel device includes processing circuitry to generate coordinate information based on a signal outputted from the touch panel and to output a detection value based on depressing force. The processing circuitry previously stores a plurality of pieces of predictive detection value information, selects a piece of predictive detection value information based on a gradient of the detection value, obtains a final predictive detection value that the predictive detection value finally reaches by using the selected predictive detection value information, obtains a present predictive detection value by using the selected predictive detection value information, and executes a correction process of reducing influence of a memory effect by bringing a present detection value close to the final predictive detection value when an absolute value of a difference between the present predictive detection value and the present detection value is less than or equal to a predetermined threshold value.

15 Claims, 19 Drawing Sheets

FIG. 3A
FIG. 3B
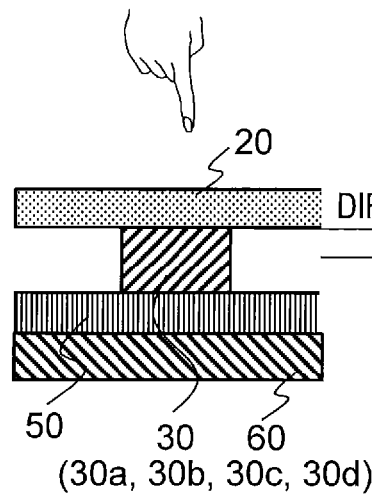
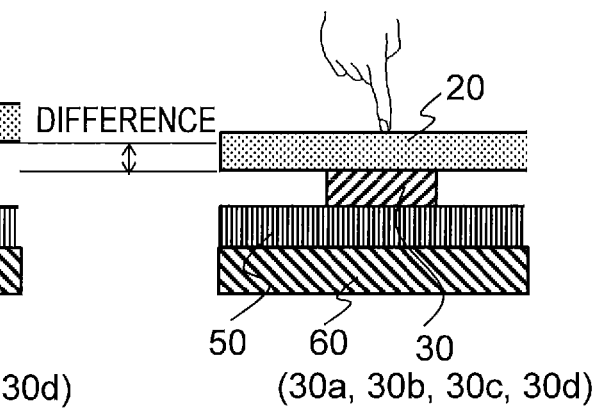
FIG. 4A
FIG. 4B
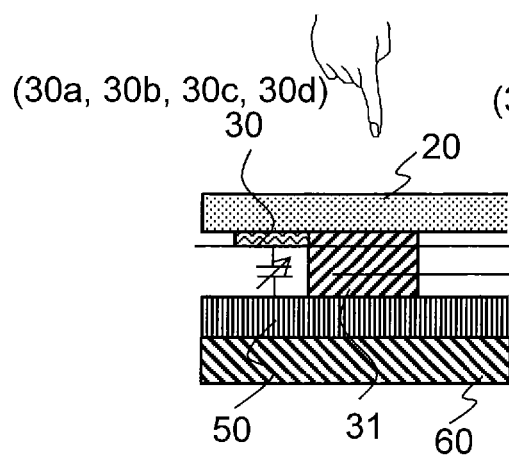
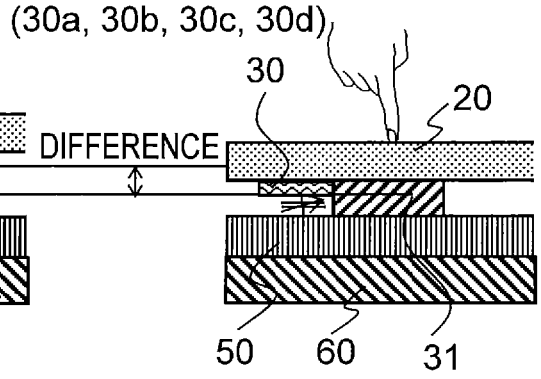

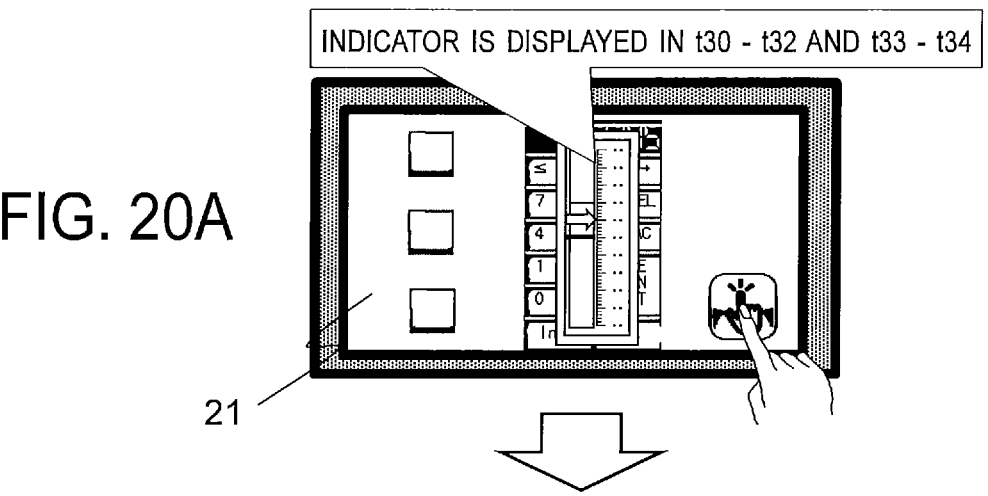
FIG. 20A
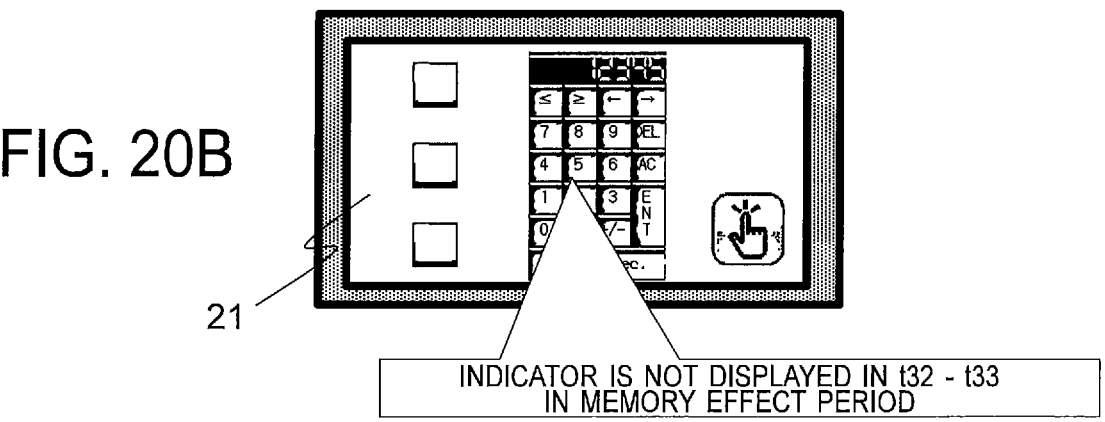
FIG. 20B
FIG. 21
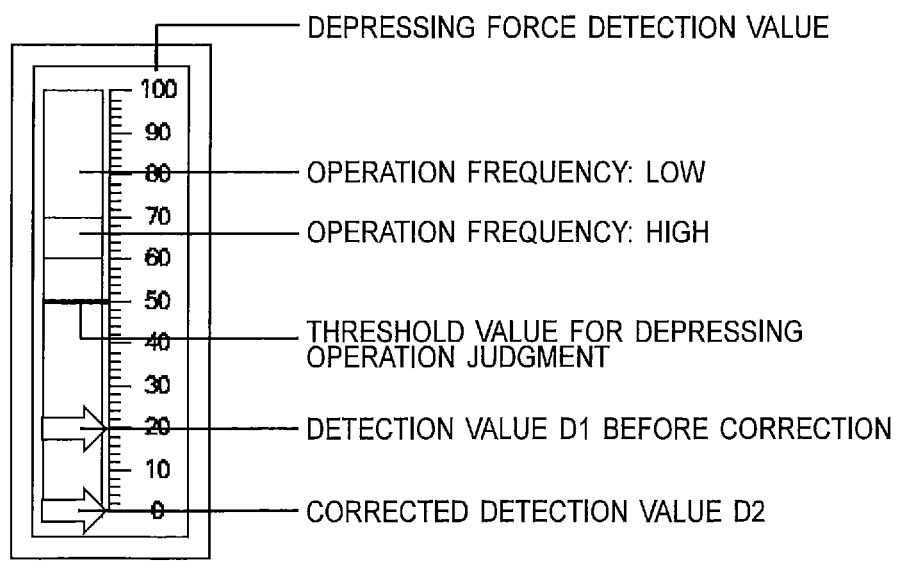

FIG. 26A

| TIME t | t0 | t1 | t2 | t3 | t4 |
|---|---|---|---|---|---|
| TIME CONSTANT $\tau_0$ | $P \times \exp(-t0/\tau_0)$ | $P \times \exp(-t1/\tau_0)$ | $P \times \exp(-t2/\tau_0)$ | $P \times \exp(-t3/\tau_0)$ | $P \times \exp(-t4/\tau_0)$ |
| OBSERVATION VALUE (DETECTION VALUE D1) | OBSERVATION VALUE 0 | OBSERVATION VALUE 1 | OBSERVATION VALUE 2 | OBSERVATION VALUE 3 | OBSERVATION VALUE 4 |
| \|f(t) - D1\| | SMALL | LARGE | LARGE | LARGE | LARGE |

FIG. 26B

| TIME t | t0 | t1 | t2 | t3 | t4 |
|---|---|---|---|---|---|
| TIME CONSTANT $\tau_1$ | $P \times \exp(-t0/\tau_1)$ | $P \times \exp(-t1/\tau_1)$ | $P \times \exp(-t2/\tau_1)$ | $P \times \exp(-t3/\tau_1)$ | $P \times \exp(-t4/\tau_1)$ |
| OBSERVATION VALUE (DETECTION VALUE D1) | OBSERVATION VALUE 0 | OBSERVATION VALUE 1 | OBSERVATION VALUE 2 | OBSERVATION VALUE 3 | OBSERVATION VALUE 4 |
| \|f(t) - D1\| | SMALL | LARGE | LARGE | LARGE | MIDDLE |

FIG. 26C

| TIME t | t0 | t1 | t2 | t3 | t4 |
|---|---|---|---|---|---|
| TIME CONSTANT $\tau_2$ | $P \times \exp(-t0/\tau_2)$ | $P \times \exp(-t1/\tau_2)$ | $P \times \exp(-t2/\tau_2)$ | $P \times \exp(-t3/\tau_2)$ | $P \times \exp(-t4/\tau_2)$ |
| OBSERVATION VALUE (DETECTION VALUE D1) | OBSERVATION VALUE 0 | OBSERVATION VALUE 1 | OBSERVATION VALUE 2 | OBSERVATION VALUE 3 | OBSERVATION VALUE 4 |
| \|f(t) - D1\| | SMALL | LARGE | LARGE | MIDDLE | SMALL |

FIG. 26D $\tau_3$ EMPLOY

| TIME t | t0 | t1 | t2 | t3 | t4 |
|---|---|---|---|---|---|
| TIME CONSTANT $\tau_3$ | $P \times \exp(-t0/\tau_3)$ | $P \times \exp(-t1/\tau_3)$ | $P \times \exp(-t2/\tau_3)$ | $P \times \exp(-t3/\tau_3)$ | $P \times \exp(-t4/\tau_3)$ |
| OBSERVATION VALUE (DETECTION VALUE D1) | OBSERVATION VALUE 0 | OBSERVATION VALUE 1 | OBSERVATION VALUE 2 | OBSERVATION VALUE 3 | OBSERVATION VALUE 4 |
| \|f(t) - D1\| | SMALL | SMALL | SMALL | SMALL | SMALL |

TOUCH PANEL DEVICE, MEMORY EFFECT CORRECTION METHOD, AND STORAGE MEDIUM STORING MEMORY EFFECT CORRECTION PROGRAM

CROSS-REFERENCE TO RELATED APPLICATION

This application is a continuation application of International Application No. PCT/JP2019/034689 having an international filing date of Sep. 4, 2019.

BACKGROUND OF THE INVENTION

1. Field of the Invention

The present disclosure relates to a touch panel device, a memory effect correction method and a memory effect correction program.

2. Description of the Related Art

There has been known a touch panel device of a pressure detection type on which a user performs an input operation by performing a depressing operation of applying depressing force to an operation surface of a touch panel (i.e., touch screen). This touch panel device is capable of providing operability similar to that of mechanical push buttons. However, in touch panel devices of the pressure detection type, there are cases where the depressing force applied to the operation surface of the touch panel cannot be detected accurately due to influence of a memory effect that is considered to derive from viscoelastic behavior of a material used for a support part (e.g., pressure sensor) supporting the touch panel.

A touch panel device described in Patent Reference 1 proposes a method for reducing the influence of the memory effect. The touch panel device of the Patent Reference 1 obtains a correction coefficient based on a detection value of the depressing force in a certain period applied by the user to the operation surface of the touch panel, executes a process of removing the influence of the memory effect from the detection value of the depressing force by using the correction coefficient, and thereby generates a corrected detection value. Patent Reference 1 is Japanese Patent Application Publication No. 2005-526337 (see paragraphs 0024 and 0051 and FIG. 9 to FIG. 12, for example).

However, the touch panel device of the Patent Reference 1 is incapable of appropriately removing the influence of the memory effect since the depressing force in a certain period applied by the user's finger fluctuates. Accordingly, the touch panel device of the Patent Reference 1 has a problem in that a detection value accurately indicating the actual depressing force cannot be obtained in a period before the influence of the memory effect disappears.

SUMMARY OF THE INVENTION

An object of the present disclosure, which has been made to resolve the above-described problem, is to provide a touch panel device, a memory effect correction method and a memory effect correction program capable of obtaining a detection value accurately indicating the depressing force applied to the operation surface of the touch panel.

A touch panel device of the present disclosure is a device that outputs a control signal corresponding to a touch operation performed on an operation surface of a touch panel, including processing circuitry to generate coordinate information based on a signal outputted from the touch panel due to the touch operation; and to output a detection value based on depressing force applied to the operation surface of the touch panel by the touch operation, wherein the processing circuitry previously stores a plurality of pieces of predictive detection value information each indicating a predictive detection value as a predictive value of the detection value, selects a piece of predictive detection value information from the plurality of pieces of predictive detection value information based on a gradient of the detection value, obtains a final predictive detection value that the predictive detection value finally reaches by using the selected predictive detection value information, obtains a present predictive detection value by using the selected predictive detection value information, and executes a correction process of reducing influence of a memory effect by bringing a present detection value close to the final predictive detection value when an absolute value of a difference between the present predictive detection value and the present detection value is less than or equal to a predetermined threshold value.

A memory effect correction method of the present disclosure includes generating coordinate information based on a signal outputted from a touch panel due to a touch operation, outputting a detection value based on depressing force applied to an operation surface of the touch panel by the touch operation, previously storing a plurality of pieces of predictive detection value information each indicating a predictive detection value as a predictive value of the detection value, selecting a piece of predictive detection value information from the plurality of pieces of predictive detection value information based on a gradient of the detection value, obtaining a final predictive detection value that the predictive detection value finally reaches by using the selected predictive detection value information, obtaining a present predictive detection value by using the selected predictive detection value information, and executing a correction process of reducing influence of a memory effect by bringing a present detection value based on the depressing force applied to the operation surface of the touch panel close to the final predictive detection value when an absolute value of a difference between the present predictive detection value and the present detection value is less than or equal to a predetermined threshold value.

By using the device or method of the present disclosure, a detection value accurately indicating the depressing force applied to the operation surface of the touch panel can be obtained.

BRIEF DESCRIPTION OF THE DRAWINGS

In the attached drawings,

FIGS. 3A and 3B are cross-sectional views schematically showing a pressure sensor of the touch panel device shown in FIG. 2;

FIGS. 4A and 4B are cross-sectional views schematically showing another example of the pressure sensor of the touch panel device;

FIGS. 20A and 20B are diagrams showing an example of an indicator image displayed on the touch panel device according to the third embodiment;

FIG. 21 is a diagram showing the example of the indicator image displayed on the touch panel device according to the third embodiment;

FIGS. 26A to 26D are diagrams showing a method of determining a time constant that reduces the absolute value of the difference between the present predictive detection value and the present detection value.

DETAILED DESCRIPTION OF THE INVENTION

Touch panel devices, memory effect correction methods and memory effect correction programs according to embodiments of the present disclosure will be described below with reference to the drawings. The following embodiments are just examples and a variety of modifications are possible within the scope of the present disclosure.

(1) First Embodiment

Figure 1:
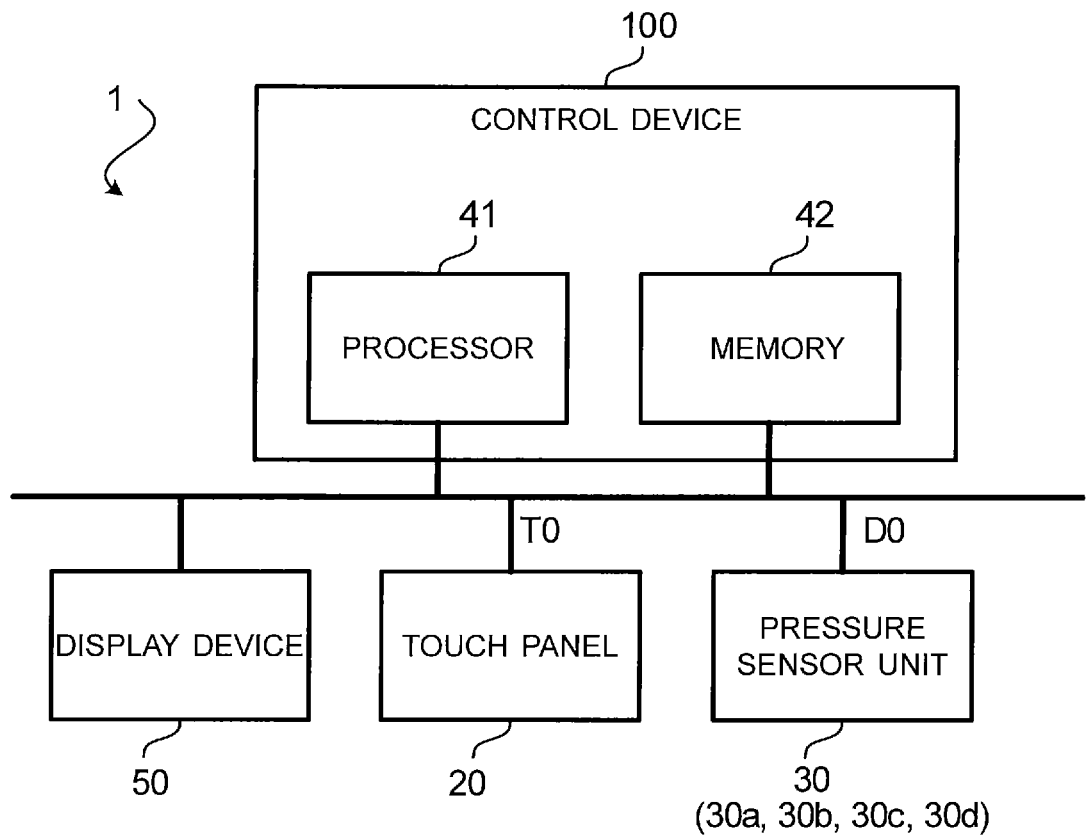
FIG. 1 is a diagram showing an example of the hardware configuration of a touch panel device according to a first embodiment of the present disclosure.

FIG. 1 is a diagram showing an example of the hardware configuration of a touch panel device 1 according to a first embodiment. As shown in FIG. 1, the touch panel device 1 includes a touch panel 20, a pressure sensor unit 30, a display device 50 and a control device 100. The touch panel 20 has an operation surface on which touch operations are performed by a user. The display device 50 is, for example, a liquid crystal display arranged in superimposition with the touch panel 20. The display device 50 may be formed integrally with the touch panel 20. The display device 50 is controlled by the control device 100 and displays images such as an operation screen. The operation screen is a user interface (UI) screen including objects as operation components such as icons. The touch panel 20 is, for example, a touch panel of the capacitive type in which the capacitance of a part of the operation surface in contact with a conductor changes. The touch panel 20 outputs touch information T0, as position information corresponding to the touch operation, to the control device 100.

The pressure sensor unit 30 includes one or more pressure sensors. In the first embodiment, the pressure sensor unit 30 includes four pressure sensors 30a, 30b, 30c and 30d. When a depressing operation, as a touch operation of applying depressing force to the operation surface of the touch panel 20, is performed by the user, the pressure sensor unit 30 outputs a sensor signal D0, as an electric signal based on the depressing force applied to the touch panel 20, to the control device 100.

The control device 100 includes a processor 41 as an information processing unit and a memory 42 as a storage unit for storing information. The control device 100 is a computer, for example. A program has been installed in the memory 42. The program is installed via a network or from a non-transitory computer-readable storage medium (i.e., tangible recording medium) storing information such as a program, for example. The program may include a memory effect correction program for executing a memory effect correction method which will be described later. The processor 41 controls the operation of the whole of the touch panel device 1 by executing the program stored in the memory 42. The whole or part of the control device 100 may be formed with a "system on chip" i.e., processing circuitry such as a control circuit made of semiconductor integrated circuits, or the like. The memory 42 can include various types of storage devices such as a semiconductor storage device, a hard disk drive and a device that records information in a removable record medium.

The control device 100 executes a process corresponding to the touch operation performed on the operation surface of the touch panel 20. The control device 100 is capable of distinguishing between a normal touch operation as a touch operation of touching the operation surface of the touch panel 20 with depressing force less than a predetermined threshold value and a depressing operation (referred to also as a "depressing touch operation") as a touch operation of touching the operation surface of the touch panel 20 with depressing force greater than or equal to the threshold value. Specifically, the control device 100 executes a process based on the capacitance change in the touch panel 20 corresponding to the touch operation performed on the operation surface of the touch panel 20 and the sensor signal D0 outputted from the pressure sensor unit 30 corresponding to the depressing force applied to the operation surface. For example, the control device 100 transmits a control signal corresponding to the touch operation performed on the operation surface of the touch panel 20 to a different apparatus connected to the touch panel device 1 or a different apparatus capable of communicating with the touch panel device 1. The different apparatus is a control target device, such as a production facility, a vehicle or a household electrical appliance, for example.

Figure 2:
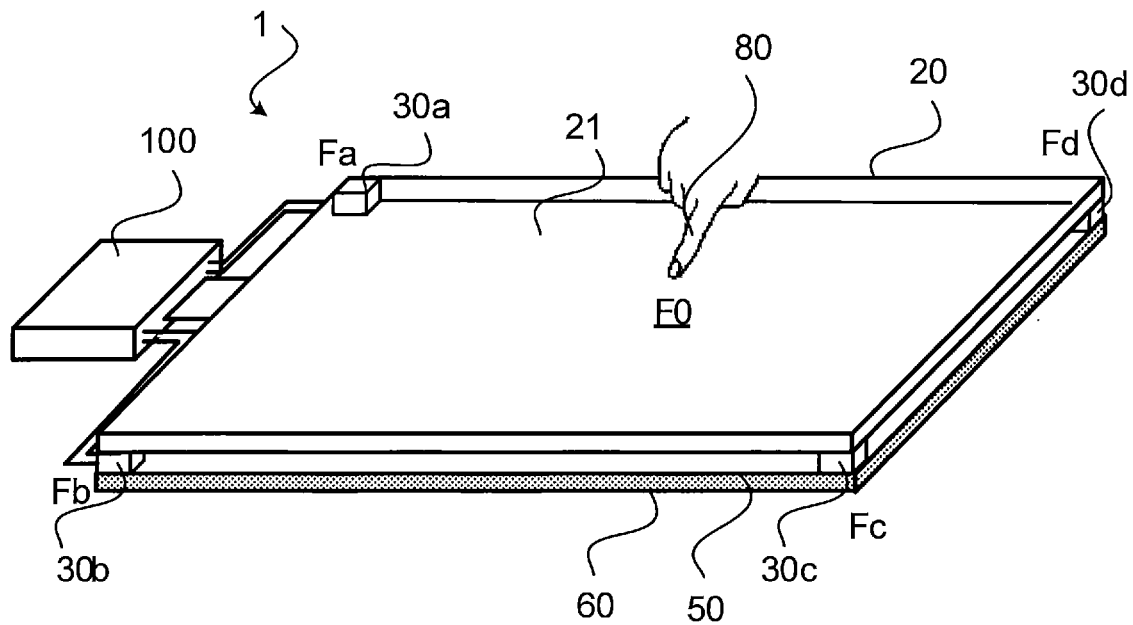
FIG. 2 is a perspective view schematically showing internal structure of the touch panel device according to the first embodiment.

FIG. 2 is a perspective view schematically showing an example of internal structure of the touch panel device 1. As shown in FIG. 2, the touch panel device 1 includes a substrate 60 famed integrally with the display device 50 and the pressure sensors 30a to 30d that support the touch panel 20 on the substrate 60. The substrate 60 can be a part of a housing of the touch panel device 1. Further, while the control device 100 is drawn outside the touch panel 20 in FIG. 2, the control device 100 can be a part of the substrate 60 or a part of a circuit board mounted on the substrate 60. In FIG. 2, the pressure sensors 30a to 30d respectively support four corner parts of the touch panel 20. The pressure sensors 30a to 30d in FIG. 2 are formed with elastic material and constitute the pressure sensor unit 30 shown in FIG. 1. Incidentally, the pressure sensors 30a to 30d may also be arranged to support the touch panel 20 at positions other than the corner parts. Further, the plan-view shape of the touch panel 20 can be a shape other than a quadrangle. Furthermore, the number of the pressure sensors supporting the touch panel 20 can also be three or less, or five or more.

As shown in FIG. 2, the touch panel 20 has an operation surface 21 that receives a touch operation performed by the user. When a conductor is in contact with the operation surface 21, the capacitance of the part in contact with the conductor changes. The conductor is, for example, a finger 80 of the user or an operation assistance tool such as a stylus pen. The control device 100 detects the capacitance at each position on the operation surface 21 and thereby obtains the position of the conductor contact part, that is, two-dimensional coordinates on the operation surface 21. Namely, the control device 100 calculates position coordinates indicating the position of the conductor contact part on the operation surface 21 based on the capacitance at each position on the operation surface 21 of the touch panel 20. The conductor contact part is, for example, a part in which the capacitance is higher than predetermined reference capacitance. The position coordinates indicating the position of the conductor contact part are referred to also as "capacitance coordinates".

The depressing force applied to the operation surface 21 of the touch panel 20 is detected by the pressure sensors 30a to 30d. The pressure sensors 30a to 30d output the sensor signal D0 as a pressure sensor signal corresponding to the depressing force F0 applied to the operation surface 21 and a pressing position. The control device 100 is capable of calculating the depressing force F0 by adding up values Fa to Fd indicated by the sensor signal D0 outputted from the pressure sensors 30a to 30d. Further, the control device 100 is capable of calculating the position coordinates indicating the pressing position on the operation surface 21 based on the values Fa to Fd indicated by the sensor signal D0. The position coordinates, i.e., the coordinates of the position where the depressing operation is performed, calculated based on the sensor signal D0 are referred to also as "pressure coordinates".

FIGS. 3A and 3B are cross-sectional views schematically showing the pressure sensor of the pressure sensor unit 30 of the touch panel device 1 shown in FIG. 2. FIG. 3A shows a state before the depressing operation and FIG. 3B shows a state in the middle of the depressing operation. In this example, the pressure sensors 30a to 30d constituting the pressure sensor unit 30 are famed with elastic material and support the touch panel 20. As shown in FIG. 3B, by the depressing operation, the pressure sensor 30a-30d is elastically deformed and becomes thinner. Further, as shown in FIG. 3A, by stopping the depressing operation, the pressure sensor 30a-30d is restored to the original state and becomes thick. As shown in FIG. 3B, the compressed pressure sensor 30a-30d outputs the sensor signal D0 indicating a value corresponding to the difference in the thickness.

FIGS. 4A and 4B are cross-sectional views schematically showing another example of the pressure sensor of the pressure sensor unit 30 of the touch panel device 1. FIG. 4A shows a state before the depressing operation and FIG. 4B shows a state in the middle of the depressing operation. In this example, the pressure sensors 30a to 30d constituting the pressure sensor unit 30 are configured separately from support parts 31 made of elastic material and supporting the touch panel 20. In this example, the pressure sensor 30a-30d detects the capacitance changed by the depressing operation and outputs the sensor signal D0 based on the capacitance. When the support part 31 is elastically deformed to be thinner by the depressing operation as shown in FIG. 4B, the capacitance detected by the pressure sensor 30a-30d increases. Further, when the support part 31 is restored to the original state to be thick by stopping the depressing operation as shown in FIG. 4A, the capacitance detected by the pressure sensor 30a-30d decreases and returns to the initial value. As shown in FIG. 4B, the pressure sensor 30a-30d outputs the sensor signal D0 indicating a value corresponding to the thickness difference of the compressed support part 31.

Figure 5:
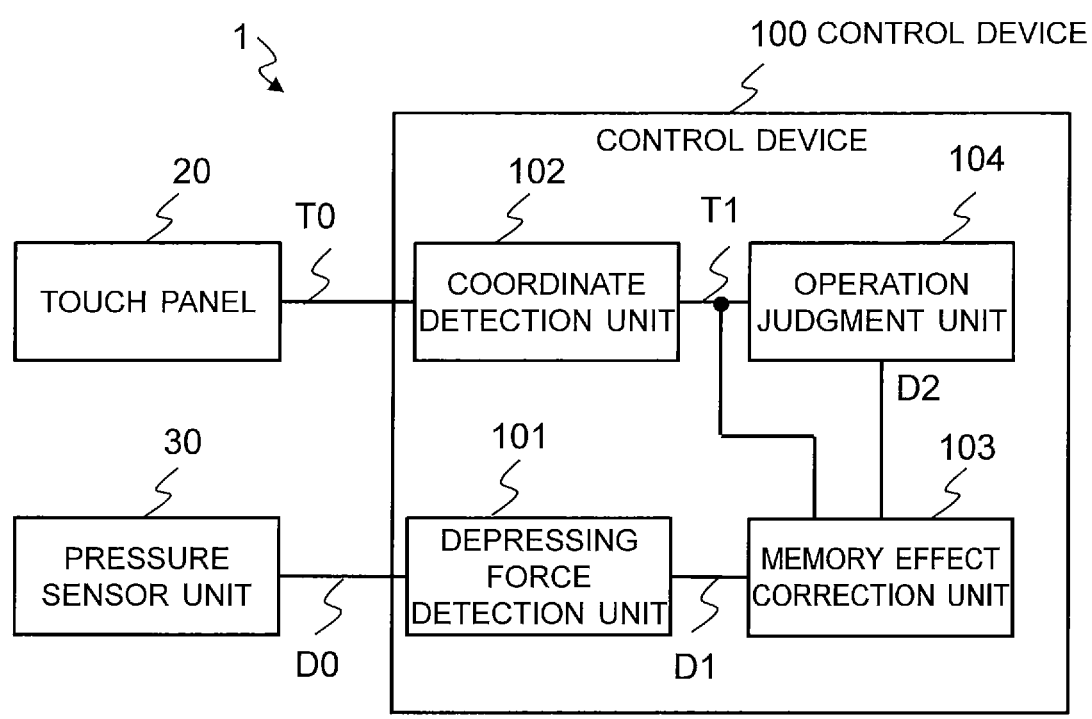
FIG. 5 is a functional block diagram schematically showing the configuration of the touch panel device according to the first embodiment.

FIG. 5 is a functional block diagram schematically showing the configuration of the touch panel device 1 according to the first embodiment. In FIG. 5, each component identical or corresponding to a component shown in FIG. 1 is assigned the same reference character as in FIG. 1. As shown in FIG. 5, the control device 100 includes a depressing force detection unit 101, a coordinate detection unit 102, a memory effect correction unit 103 and an operation judgment unit 104.

The coordinate detection unit 102 generates coordinate information T1 based on the touch information T0 outputted from the touch panel 20 due to the touch operation. Specifically, the coordinate detection unit 102 detects the presence or absence (i.e., presence/absence) of contact of a conductor with the operation surface 21 by detecting the capacitance at each position on the operation surface 21 of the touch panel 20. The coordinate detection unit 102 calculates the coordinate information T1 indicating the coordinates of the conductor contact part as a region in which the detection value of the capacitance is higher than predetermined threshold capacitance. The coordinate detection unit 102 supplies the coordinate information T1 to the memory effect correction unit 103 and the operation judgment unit 104.

The depressing force detection unit 101 outputs a detection value D1 based on the depressing force F0 applied to the operation surface 21 of the touch panel 20 by the touch operation. Specifically, the depressing force detection unit 101 receives the sensor signal D0 outputted from the pressure sensors 30a to 30d constituting the pressure sensor unit 30 and outputs the detection value D1 based on the sensor signal D0. When pressure values indicated by the sensor signal D0 outputted from the pressure sensors 30a to 30d are Fa, Fb, Fc and Fd, the detection value D1 is the total value, the average value or the like of the pressure values Fa to Fd.

The memory effect correction unit 103 has previously stored information indicating a predictive detection value as a predictive value of the detection value D1 outputted from the depressing force detection unit 101 when the depressing force F0 by the touch operation changes. The information indicating the predictive detection value is, for example, a predictive detection value function f(t) which will be described later. In the first embodiment, when the depressing force F0 changes is when the application of the depressing force by the depressing operation is started or when the depressing force is increased.

The memory effect correction unit 103 previously stores a plurality of pieces of predictive detection value information (e.g., a plurality of predictive detection value functions) each indicating the predictive detection value as the predictive value of the detection value D1 outputted from the depressing force detection unit 101 and selects a piece of predictive detection value information (e.g., one predictive detection value function f(t)) from the plurality of pieces of predictive detection value information based on a gradient of the detection value D1.

Subsequently, the memory effect correction unit 103 obtains a final predictive detection value P that the predictive detection value finally reaches by using the selected predictive detection value information (e.g., predictive detection value function f(t)) and obtains a present predictive detection value E1 by using the selected predictive detection value information (e.g., predictive detection value function f(t)).

Subsequently, the memory effect correction unit 103 executes a correction process of reducing the memory effect by bringing a present detection value D1 outputted from the depressing force detection unit 101 close to the final predictive detection value P when the absolute value |E1−D1| of the difference between the present predictive detection value E1 and the present detection value D1 is less than or equal to a predetermined threshold value Th. By this correction process, a corrected detection value D2 is obtained.

When the absolute value |E1−D1| of the difference is less than or equal to the threshold value Th, the memory effect correction unit 103 generates the corrected detection value D2 by decreasing a first weight coefficient $W_D$ indicating reliability of the present detection value D1, increasing a second weight coefficient $W_P$ indicating reliability of the final predictive detection value P, and performing weighted addition of the present detection value D1 and the final predictive detection value P.

When the absolute value |E1−D1| of the difference is greater than the threshold value Th, the memory effect correction unit 103 generates the corrected detection value D2 by increasing the first weight coefficient $W_D$ indicating the reliability of the present detection value D1, decreasing the second weight coefficient $W_P$ indicating the reliability of the final predictive detection value P, and performing the weighted addition of the present detection value D1 and the final predictive detection value P. Details of the correction process will be described later.

The operation judgment unit 104 judges operation information inputted by the touch operation based on the coordinate information T1 acquired from the coordinate detection unit 102 and the corrected detection value D2 acquired from the memory effect correction unit 103. The operation judgment unit 104 executes an operation corresponding to the touch operation. For example, the operation judgment unit 104 outputs an operation signal to an operation target apparatus (not shown).

Figure 6:
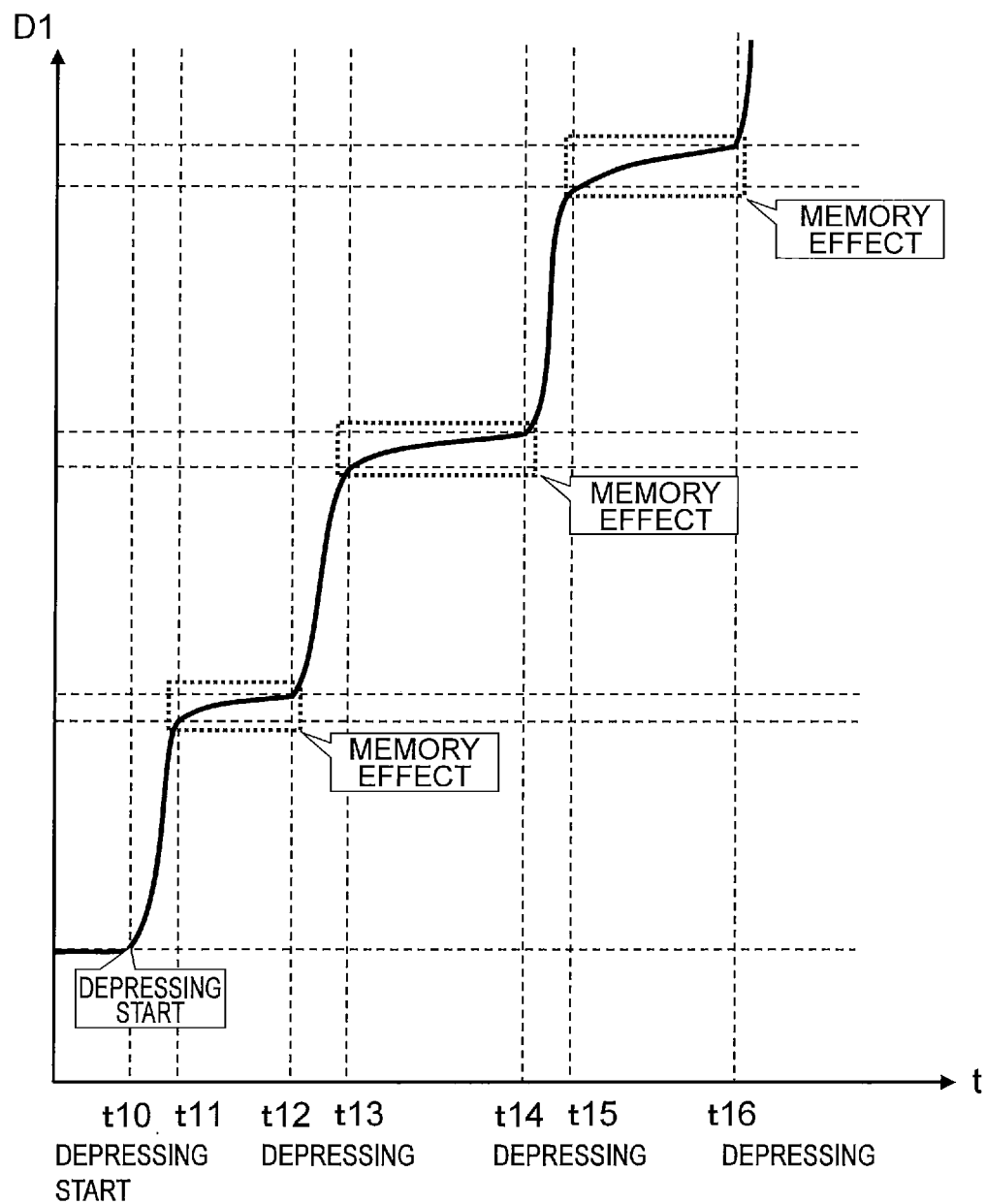
FIG. 6 is a graph showing a detection value before correction that is outputted from a depressing force detection unit when a depressing operation of applying depressing force to an operation surface of a touch panel of the touch panel device according to the first embodiment is performed.

FIG. 6 is a diagram showing the detection value D1 outputted from the depressing force detection unit 101 when the depressing operation of applying depressing force to the operation surface 21 of the touch panel 20 is performed. When the user starts the depressing operation on the operation surface 21 of the touch panel 20, the pressure sensor unit 30 outputs the sensor signal D0 based on a depressing amount, and the depressing force detection unit 101 outputs the detection value D1 corresponding to the sensor signal D0.

As shown in FIG. 6, the detection value D1 outputted from the depressing force detection unit 101 rapidly increases in a period from time t10 to time t11 just after the start of the depressing operation, whereas the detection value D1 monotonically increases gradually due to the influence of the memory effect in a period from time t11 to time t12. Thereafter, when the user further depresses the operation surface 21 of the touch panel 20, the detection value D1 outputted from the depressing force detection unit 101 rapidly increases in a period from time t12 to time t13 (or from time t14 to time t15), and thereafter in a period from time t13 to time t14 (or from time t15 to time t16), the detection value D1 monotonically increases gradually due to the influence of the memory effect.

As above, until the detection value D1 outputted from the depressing force detection unit 101 reaches a value corresponding to the depressing force of the depressing operation on the operation surface 21 of the touch panel 20, namely, a final value, it is necessary to wait for a time in which the influence of the memory effect disappears.

Figure 7:
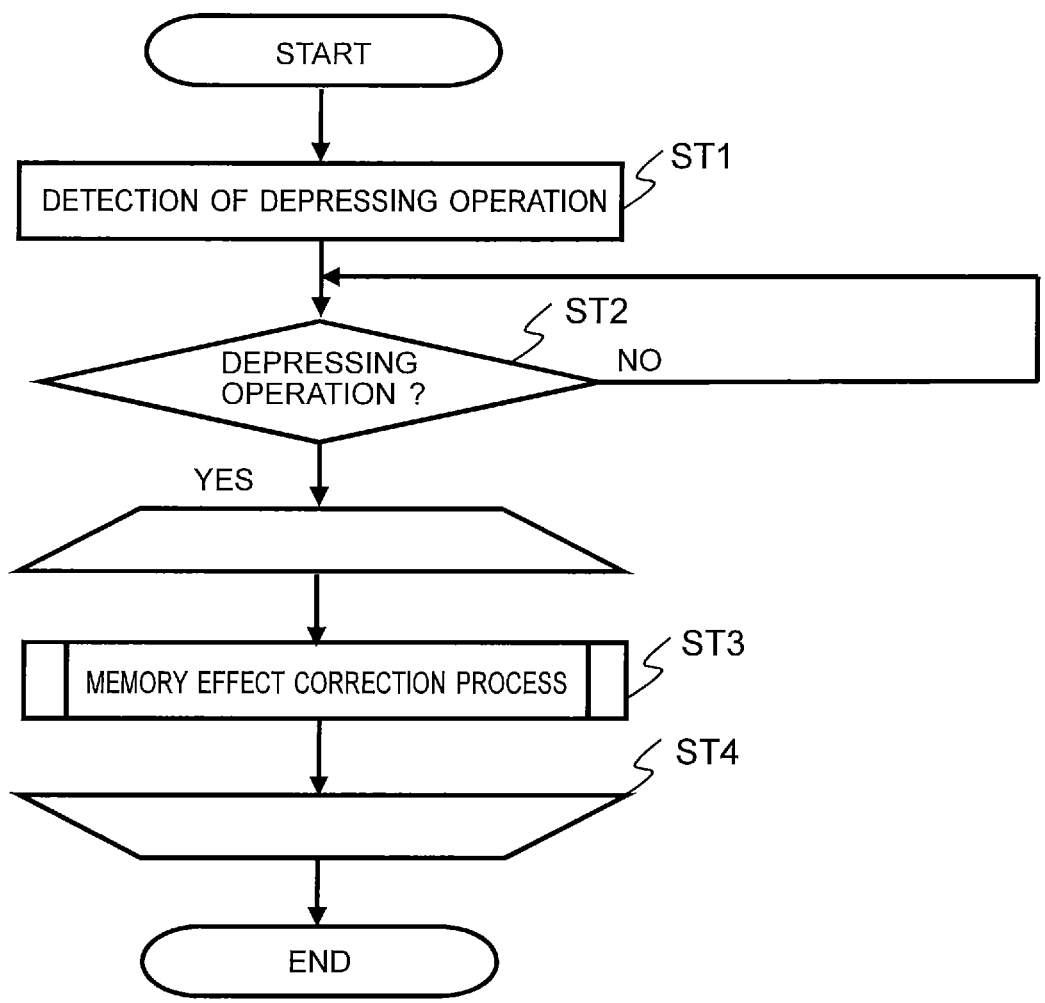
FIG. 7 is a flowchart showing a correction process for reducing influence of a memory effect appearing in the detection value outputted from the depressing force detection unit when the depressing operation on the operation surface of the touch panel of the touch panel device according to the first embodiment is performed.

FIG. 7 is a flowchart showing the correction process for reducing the influence of the memory effect appearing in the detection value D1 outputted from the depressing force detection unit 101 when the depressing operation on the operation surface 21 of the touch panel 20 of the touch panel device 1 according to the first embodiment is performed.

In step ST1, when the user performs the depressing operation on the operation surface 21 of the touch panel 20, the touch panel 20 outputs the touch information T0 indicating the change in the capacitance in the touched region, and the coordinate detection unit 102 outputs the coordinate information T1 corresponding to the received touch information T0. Further, when the user performs the depressing operation on the operation surface 21 of the touch panel 20, the pressure sensor unit 30 outputs the sensor signal D0 based on the depressing force applied by the depressing operation, and the depressing force detection unit 101 outputs the detection value D1 corresponding to the received sensor signal D0.

In step ST2, the memory effect correction unit 103 judges the presence/absence of the depressing operation as a touch operation by the user. When there is no depressing operation by the user, the memory effect correction unit 103 makes the judgment on the presence/absence of the depressing operation again.

When there is a depressing operation by the user, the process advances from the step ST2 to step ST3 and the memory effect correction unit 103 executes a memory effect correction process. By a loop process indicated as step ST4, the memory effect correction process of the step ST3 is repeated throughout a period in which the depressing operation on the operation surface 21 of the touch panel 20 is performed.

Figure 8:
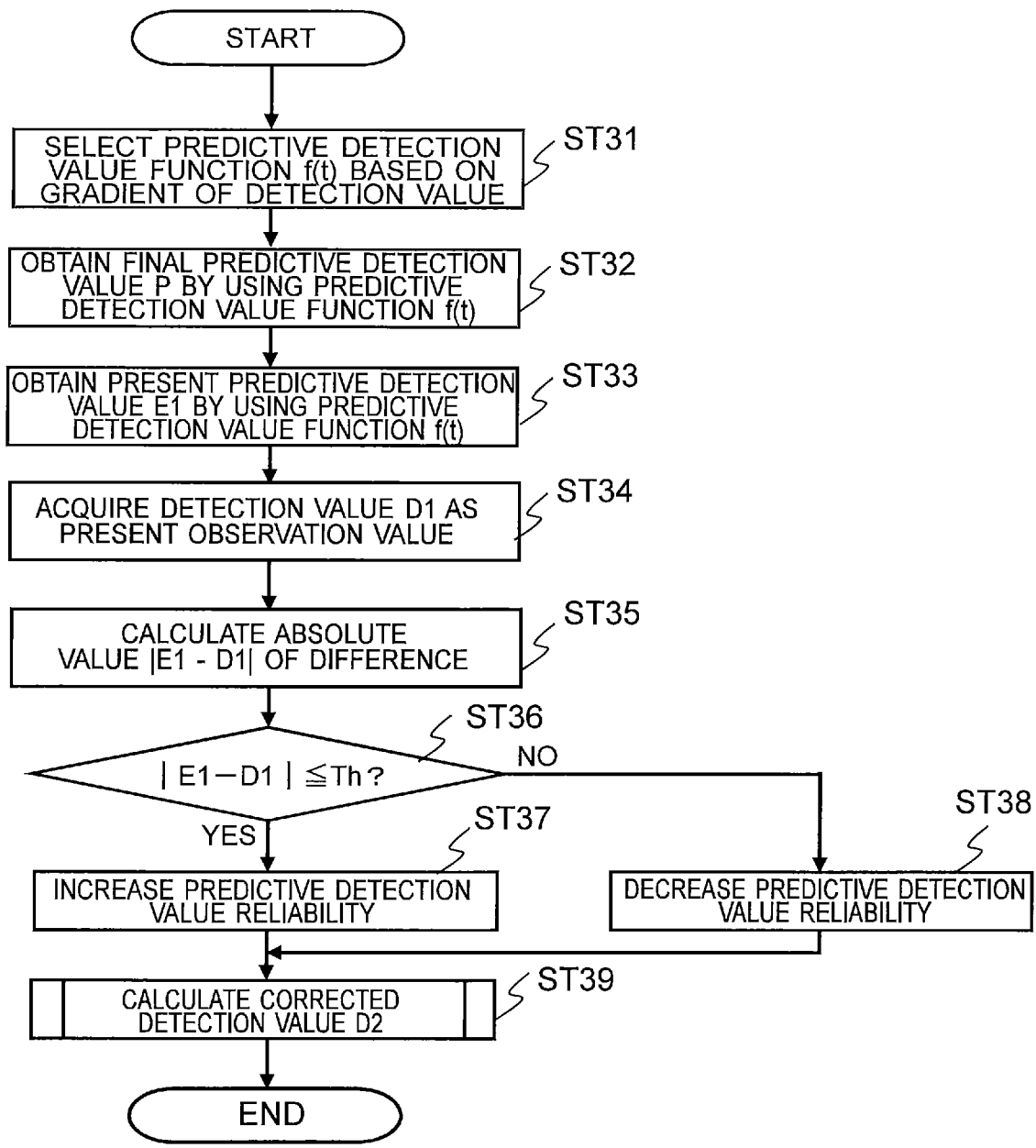
FIG. 8 is a flowchart showing details of a correction process shown in FIG. 7.

FIG. 8 is a flowchart showing details of the memory effect correction process indicated as the step ST3 in FIG. 7. In step ST31, the memory effect correction unit 103 obtains the predictive detection value function f(t), as the information indicating the predictive detection value of the depressing force, based on the gradient of the detection value D1 outputted from the depressing force detection unit 101. The memory effect correction unit 103 includes a storage unit that previously stores the predictive detection value function f(t). The predictive detection value function f(t) can be represented by the following expression (1), for example:

$$f(t)=P\times(1-\exp(-t/\tau)) \quad (1).$$

In the expression (1), t represents an elapsed time since the time point of starting the depressing operation, $\tau$ represents a time constant, P represents the final predictive detection value as the final value of the predictive detection value of the depressing force detection value D1, and f(t) represents the predictive detection value of the depressing force at a time point when the elapsed time t has passed.

However, it is also possible for the memory effect correction unit 103 to store information in a different format indicating a relationship between an elapsed time since a time when the depressing force applied to the touch panel 20 changed and the predictive detection value, instead of the predictive detection value function f(t), as the information indicating the predictive detection value. Specifically, the memory effect correction unit 103 may previously acquire data indicating a relationship between the actual depressing force F0 [N (Newton)] applied to the touch panel 20 and the detection value D1 outputted from the depressing force detection unit 101 at that time and hold the data in the storage unit as correspondence relationship information indicating the relationship between the depressing force F0 and the detection value D1 outputted from the depressing force detection unit 101. F0 [N] represents 1 [N], 2 [N], 3 [N] and so forth, for example. The correspondence relationship information is a data table, for example.

Figure 9:
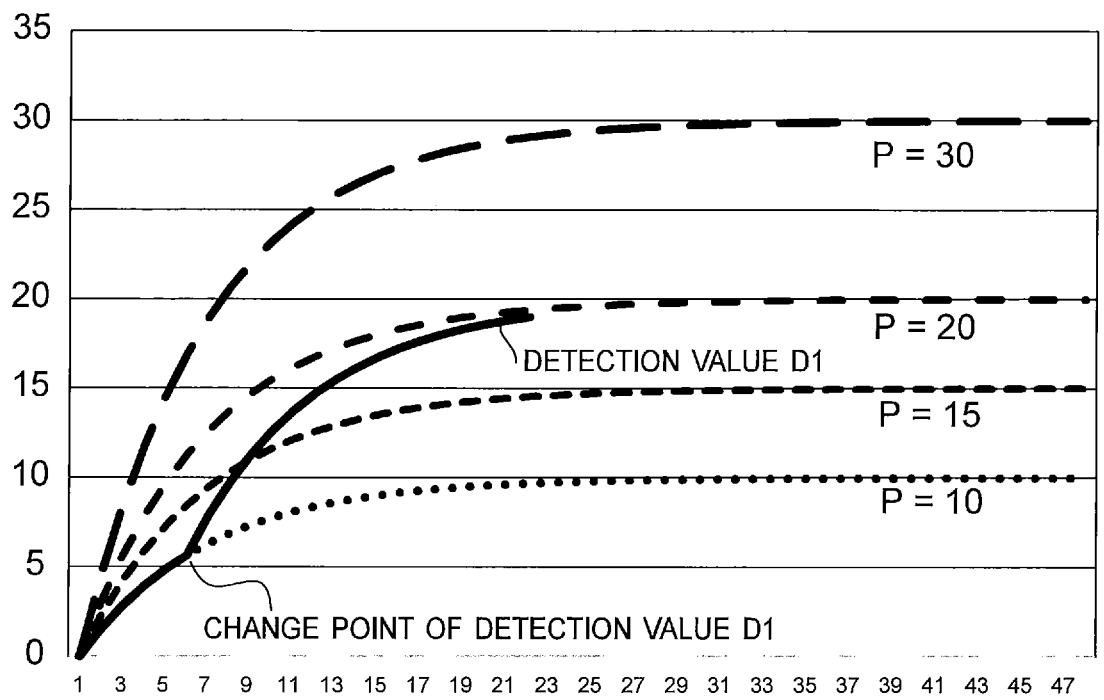
FIG. 9 is a graph showing examples of a predictive detection value function represented by using a final predictive detection value of the depressing force and a time constant.
Figure 10:
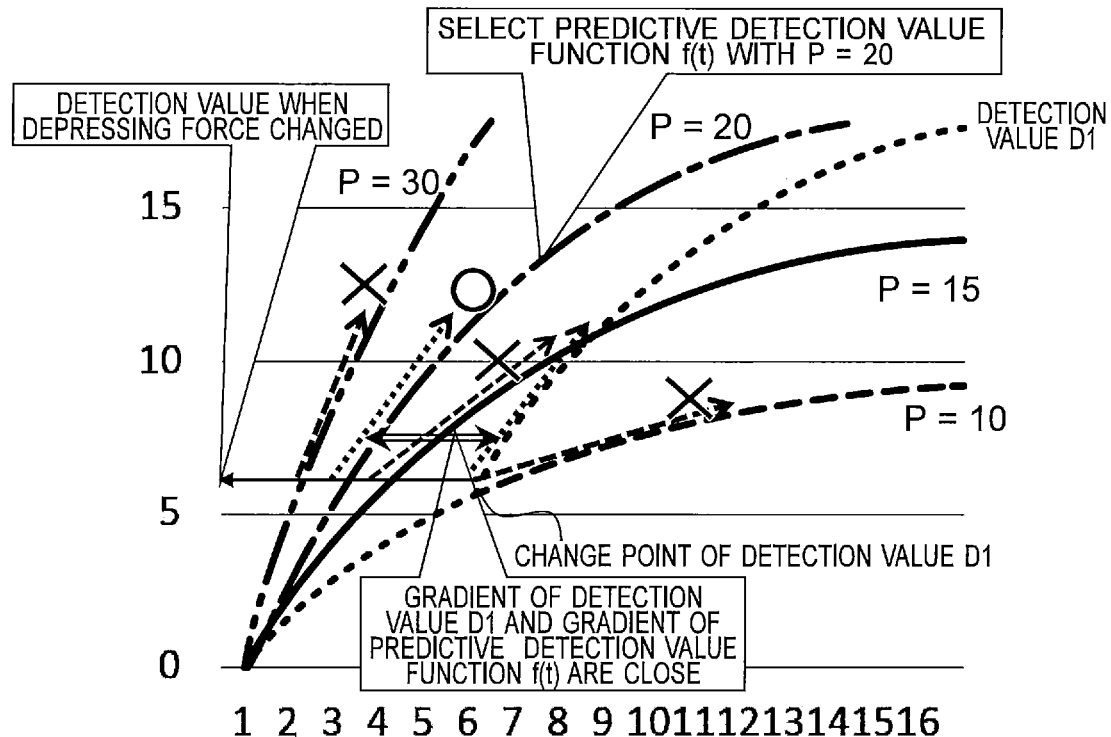
FIG. 10 is a diagram showing a magnification of a principal part of the graph of the examples of the predictive detection value function shown in FIG. 9.

FIG. 9 is a graph showing examples of the predictive detection value function f(t) represented by using the final predictive detection value of the depressing force and the time constant, and a detection value D1 in which the depressing force F0 changes in the middle. FIG. 10 is a diagram showing a magnification of the graph of the examples of the predictive detection value function f(t) and the example of the detection value D1 in which the depressing force F0 changes in the middle shown in FIG. 9.

FIG. 9 and FIG. 10 show four predictive detection value functions f(t) in cases where the time constant $\tau$ is constant and the detection value of the depressing force is estimated to finally reach 10, 15, 20 and 30. In other words, the values of the final predictive detection values P in the four predictive detection value functions f(t) are 10, 15, 20 and 30. Namely, in the four predictive detection value functions f(t), P=10, P=15, P=20 and P=30. In FIG. 9 and FIG. 10, a change point of the detection value D1 in a case where the depressing force F0 changes in the middle is shown. When the gradient of the detection value D1 has changed, the memory effect correction unit 103 selects a new predictive detection value function f(t). In the example shown in FIG. 9 and FIG. 10, the predictive detection value function f(t) with P=10 having the closest gradient is selected before the change of the detection value D1, and the predictive detection value function f(t) with P=20 having the closest gradient is selected after the change of the detection value D1.

In step ST32 in FIG. 8, the memory effect correction unit 103 calculates the final predictive detection value P, as the final value of the depressing force detection value D1 outputted from the depressing force detection unit 101, by using the selected predictive detection value function f(t).

In step ST33, the memory effect correction unit 103 obtains the present predictive detection value E1, as the present predictive value of the depressing force detection value, by using the selected predictive detection value function f(t).

In step ST34, the memory effect correction unit 103 acquires the depressing force detection value D1 outputted from the depressing force detection unit 101.

In step ST35, the memory effect correction unit 103 calculates the absolute value |E1−D1| of the difference between the present predictive detection value E1 calculated by using the predictive detection value function f(t) and the depressing force detection value D1 outputted from the depressing force detection unit 101.

In step ST36, the memory effect correction unit 103 judges whether or not the absolute value |E1−D1| of the difference is less than or equal to the predetermined threshold value Th.

When the absolute value |E1−D1| of the difference is less than or equal to the threshold value Th, the process advances from the step ST36 to step ST37 and the memory effect correction unit 103 increases reliability of the predictive detection value as the reliability of the final predictive detection value P. For example, the memory effect correction unit 103 sets the reliability of the predictive detection value at a level higher than the reliability of the actual detection value D1.

When the absolute value |E1−D1| of the difference is greater than the threshold value Th, the process advances from the step ST36 to step S38 and the memory effect correction unit 103 decreases the reliability of the predictive detection value. For example, the memory effect correction unit 103 sets the reliability of the predictive detection value at a level lower than the reliability of the actual detection value D1.

In step ST39, the memory effect correction unit 103 calculates the corrected detection value D2 depending on the reliability of the predictive detection value. Details of the calculation of the corrected detection value D2 will be described below.

Figure 11:
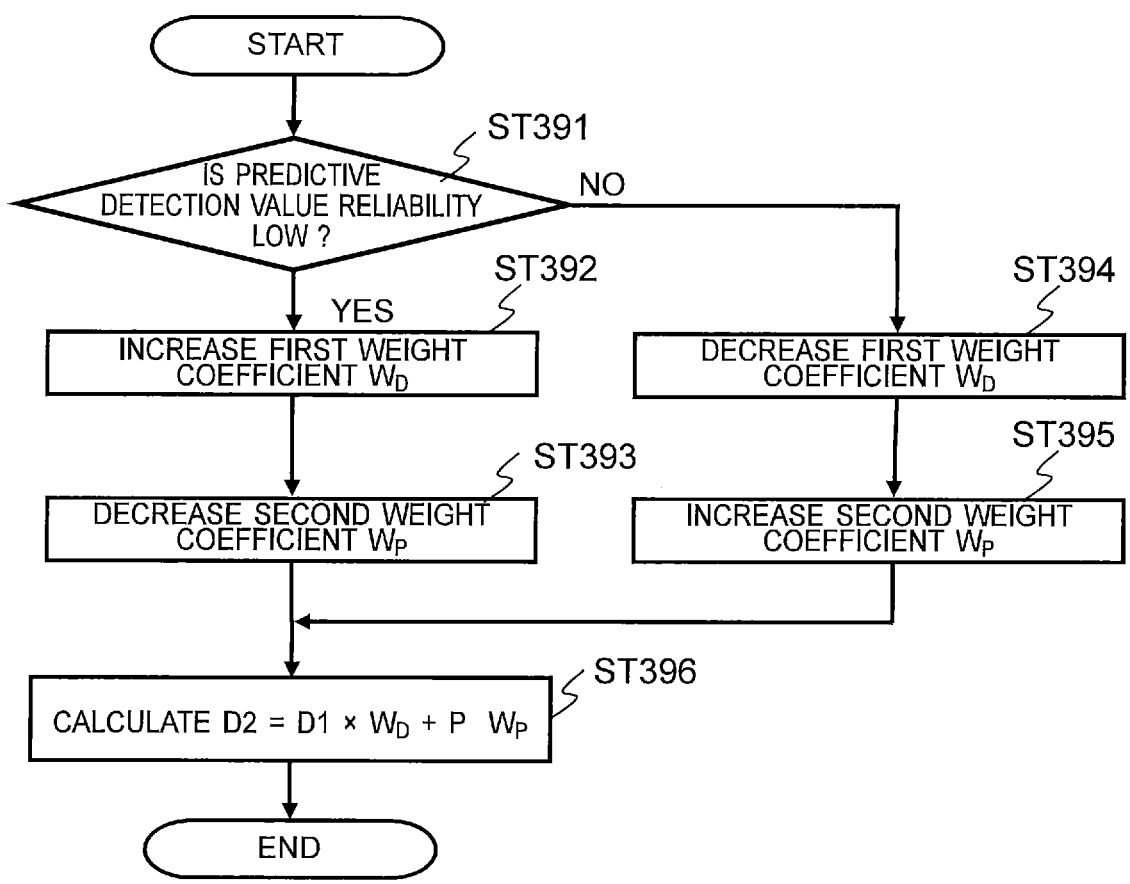
FIG. 11 is a flowchart showing details of a process for calculating a corrected detection value shown in FIG. 8.

FIG. 11 is a flowchart showing the details of the process for calculating the corrected detection value D2 shown in FIG. 8. In step ST391, the memory effect correction unit 103 judges whether or not the reliability of the predictive detection value is low.

When the reliability of the predictive detection value has been set at a low level, the process advances from the step ST391 to step ST392. In this case, the memory effect correction unit 103 judges that the reliability of the predictive detection value function f(t) is low, and in order to place more weight on the depressing force detection value D1 outputted from the depressing force detection unit 101, increases the value of the first weight coefficient $W_D$ as the multiplier for the depressing force detection value D1 in step ST392, and decreases the value of the second weight coefficient $W_P$ as the multiplier for the present predictive detection value E1 in step ST393. Here, $0 \leq W_D \leq 1$, $0 \leq W_P \leq 1$ and $W_D + W_P = 1$ hold. The memory effect correction unit 103 determines the first and second weight coefficients to satisfy $W_D > W_P$, for example.

When the reliability of the predictive detection value has not been set at a low level, the process advances from the step ST391 to step ST394. In this case, the memory effect correction unit 103 judges that the reliability of the predictive detection value function f(t) is high, and in order to place more weight on the second weight coefficient $W_P$ as the multiplier for the present predictive detection value E1, decreases the value of the first weight coefficient $W_D$ as the multiplier for the depressing force detection value D1 in step ST394, and increases the value of the second weight coefficient $W_P$ as the multiplier for the present predictive detection value E1 in step ST395. Here, $0 \leq W_D \leq$, $0 \leq W_P \leq 1$ and $W_D + W_P = 1$ hold. The memory effect correction unit 103 determines the first and second weight coefficients to satisfy $W_D < W_P$, for example.

In step ST396, the memory effect correction unit 103 calculates the corrected detection value D2 by correcting the depressing force detection value D1 outputted from the depressing force detection unit 101 by using the following expression (2):

$$D2 = D1 \times W_D + P \times W_P \qquad (2).$$

Figure 12:
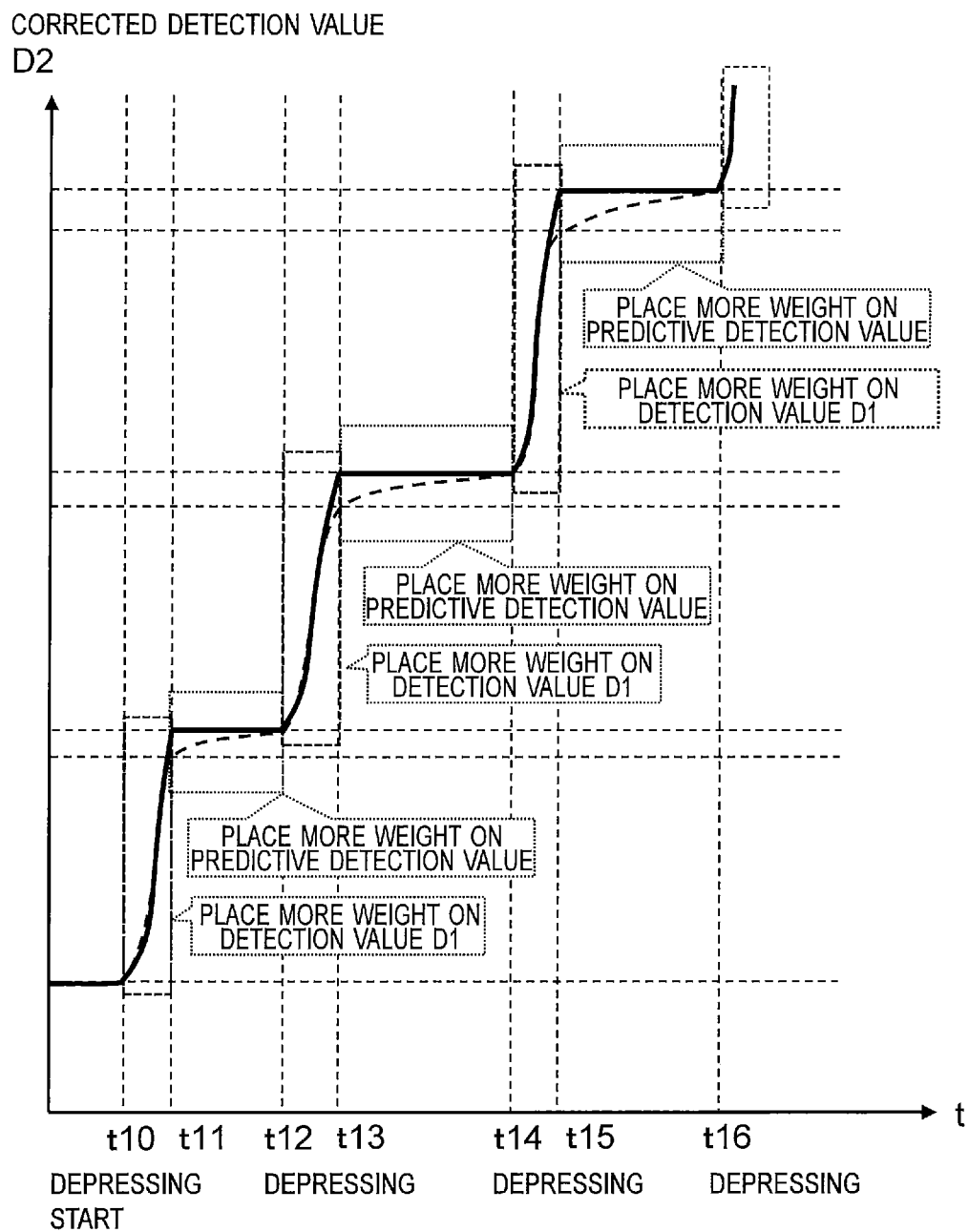
FIG. 12 is a graph showing the corrected detection value outputted from a memory effect correction unit when the depressing operation on the operation surface of the touch panel of the touch panel device according to the first embodiment is performed.

FIG. 12 is a graph showing the corrected detection value D2 outputted from the memory effect correction unit 103 when the depressing operation on the operation surface 21 of the touch panel 20 of the touch panel device 1 according to the first embodiment is performed. When the reliability of the predictive detection value function f(t) has become high, the corrected detection value D2 is calculated by placing more weight on the predictive detection value, and thus as indicated by the solid lines in FIG. 12, the touch panel device 1 is capable of reducing the influence of the memory effect deriving from the slowness of the thickness restoration of the pressure sensors 30a to 30d or the support part 31 as the elastic material supporting the touch panel 20.

As described above, by using the touch panel device 1, the memory effect correction method and the memory effect correction program according to the first embodiment, the accuracy of the corrected detection value D2 at the time of the depressing operation can be increased. Further, operability at the time of the depressing operation can be increased.

(2) Second Embodiment

The memory effect correction process in the touch panel device 1 according to the first embodiment is a process of generating the corrected detection value D2 by reducing the influence of the memory effect from the depressing force detection value D1 at the time of the start of the depressing operation on the operation surface 21 of the touch panel 20. In contrast, a memory effect correction process in a touch panel device 2 according to a second embodiment is a process of generating the corrected detection value D2 by reducing the influence of the memory effect from the depressing force detection value D1 at the time of a release operation of releasing the finger performing the depressing operation from the operation surface 21 of the touch panel 20.

Figure 13:
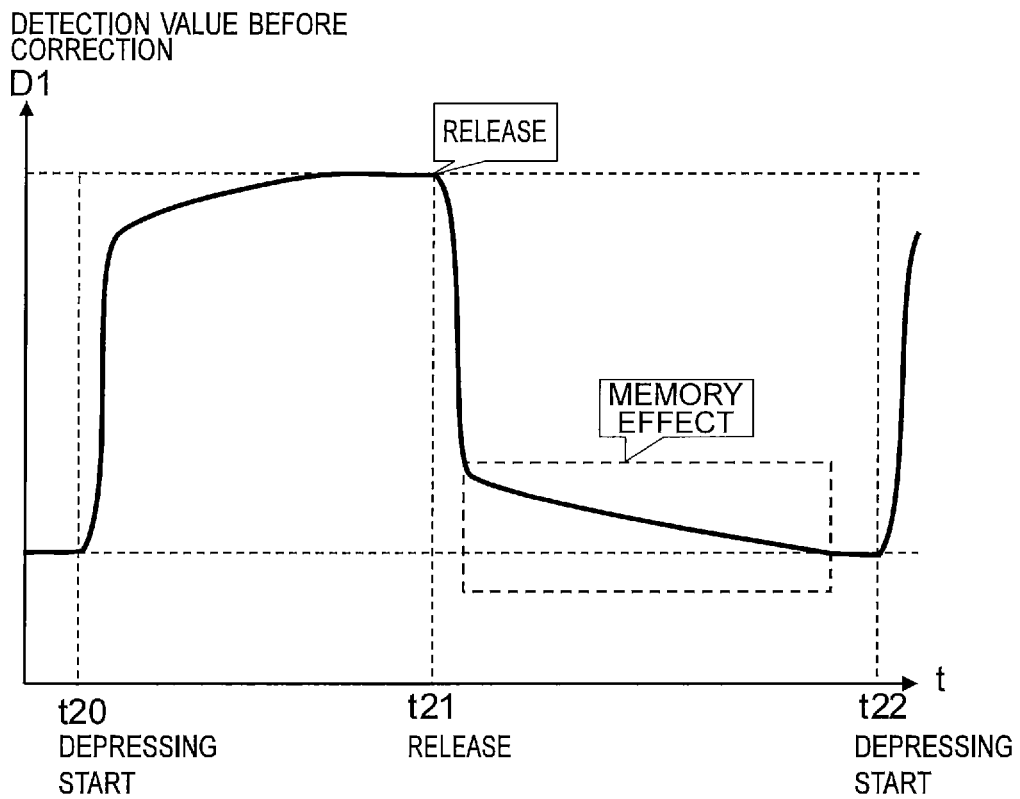
FIG. 13 is a graph showing the detection value before correction that is outputted from the depressing force detection unit when the depressing operation on the operation surface of the touch panel of a touch panel device according to a second embodiment is performed and thereafter a release operation is performed.

FIG. 13 is a graph showing the detection value D1 before correction outputted from the depressing force detection unit 101 of a control device 200 when the depressing operation on the operation surface 21 of the touch panel 20 of the touch panel device 2 according to the second embodiment is started and thereafter the release operation is performed. The release operation is the operation of releasing the finger from the operation surface 21 of the touch panel 20. The whole or part of the control device 200 may be formed with processing circuitry. As shown in FIG. 13, in the touch panel device 2, the influence of the memory effect appears in the detection value at the time of the release operation. Therefore, the touch panel device 2 according to the second embodiment detects the release operation and executes a correction process of reducing the influence of the memory effect at the time of the release operation.

Figure 14:
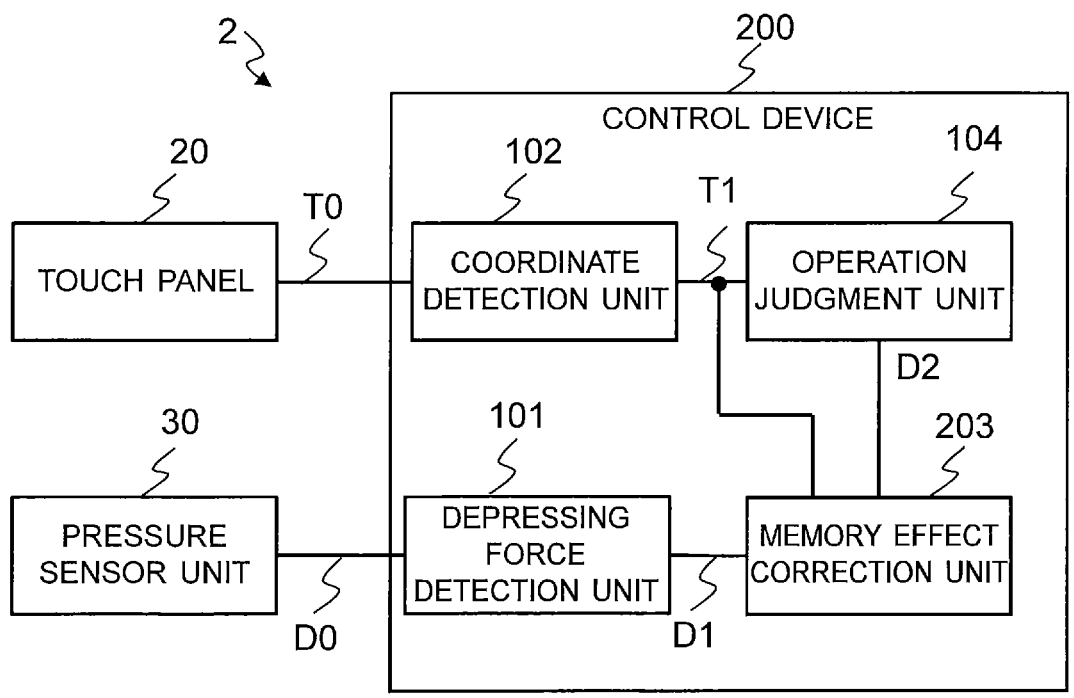
FIG. 14 is a functional block diagram schematically showing the configuration of the touch panel device according to the second embodiment.

FIG. 14 is a functional block diagram schematically showing the configuration of the touch panel device 2 according to the second embodiment. In FIG. 14, each component identical or corresponding to a component shown in FIG. 5 is assigned the same reference character as in FIG. 5. In FIG. 14, the depressing force detection unit 101 acquires the sensor signal D0 outputted from the pressure sensor unit 30. The coordinate detection unit 102 detects the releasing of the finger that has been in contact with the touch panel 20. A memory effect correction unit 203 acquires information indicating the release operation from the coordinate detection unit 102, acquires the detection value D1 from the depressing force detection unit 101, and thereby generates the corrected detection value D2 by correcting the detection value D1 at the time of the release operation.

The memory effect correction unit 203 have previously stored the information indicating the predictive detection value as the predictive value of the detection value D1 outputted from the depressing force detection unit 101 when the depressing force F0 by the touch operation changes. The information indicating the predictive detection value is, for example, the predictive detection value function f(t). In the second embodiment, when the depressing force F0 changes is at the time of the release operation of stopping the application of depressing force by the depressing operation.

The memory effect correction unit 203 previously stores a plurality of predictive detection value functions each indicating the predictive detection value as the predictive value of the detection value D1 outputted from the depressing force detection unit 101 and selects one predictive detection value function f(t) from the plurality of predictive detection value functions based on the gradient of the detection value D1.

Subsequently, the memory effect correction unit 203 obtains the final predictive detection value P that the predictive detection value finally reaches by using the selected predictive detection value function f(t) and obtains the present predictive detection value E1 by using the selected predictive detection value function f(t).

Subsequently, the memory effect correction unit 203 executes the correction process of bringing the present detection value D1 outputted from the depressing force detection unit 101 close to the final predictive detection value P when the absolute value |E1−D1| of the difference between the present predictive detection value E1 and the present detection value D1 is less than or equal to the predetermined threshold value Th.

When the absolute value |E1−D1| of the difference is less than or equal to the threshold value Th, the memory effect correction unit 203 generates the corrected detection value D2 by decreasing the first weight coefficient $W_D$ indicating the reliability of the detection value D1, increasing the second weight coefficient $W_P$ indicating the reliability of the final predictive detection value P, and performing weighted addition of the detection value D1 and the final predictive detection value P.

When the absolute value |E1−D1| of the difference is greater than the threshold value Th, the memory effect correction unit 203 generates the corrected detection value D2 by increasing the first weight coefficient $W_D$ indicating the reliability of the detection value D1, decreasing the second weight coefficient $W_P$ indicating the reliability of the final predictive detection value P, and performing the weighted addition of the detection value D1 and the final predictive detection value P. Details of the correction process will be described later.

The operation judgment unit 104 judges the operation information inputted by the touch operation based on the coordinate information T1 acquired from the coordinate detection unit 102 and the corrected detection value D2 acquired from the memory effect correction unit 203. The operation judgment unit 104 executes a process corresponding to the touch operation.

Figure 15:
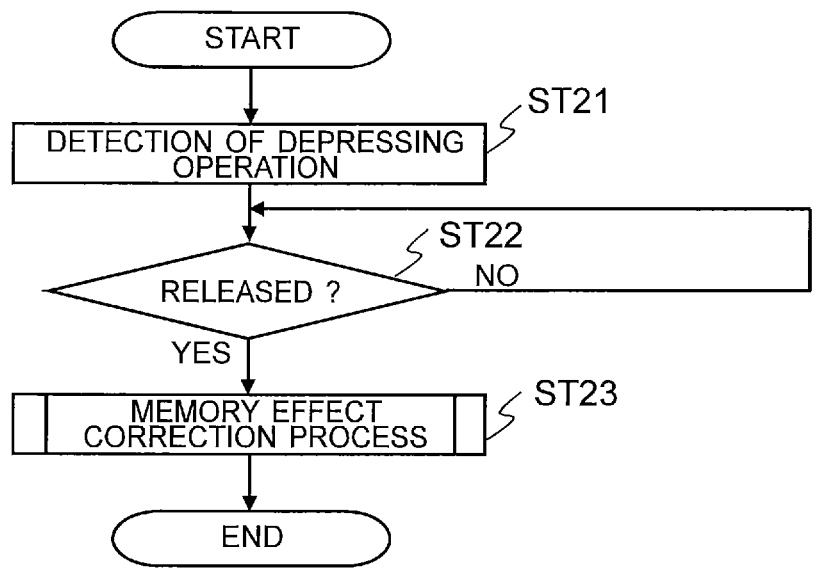
FIG. 15 is a flowchart showing a correction process for reducing the influence of the memory effect appearing in the detection value outputted from the depressing force detection unit when the depressing operation on the operation surface of the touch panel of the touch panel device according to the second embodiment is performed and thereafter the release operation is performed.

FIG. 15 is a flowchart showing the correction process for reducing the influence of the memory effect appearing in the detection value D1 outputted from the depressing force detection unit 101 when the depressing operation on the operation surface 21 of the touch panel 20 of the touch panel device 2 according to the second embodiment is performed and thereafter the release operation is performed.

In step ST21, when the user performs the depressing operation on the operation surface 21 of the touch panel 20 (time T20 in FIG. 16 which will be described later), the touch panel 20 outputs the touch information T0 indicating the change in the capacitance in the touched region, and the coordinate detection unit 102 outputs the coordinate information T1 corresponding to the received touch information T0. Further, when the user performs the depressing operation on the touch panel 20, the pressure sensor unit 30 outputs the sensor signal D0 based on the depressing force applied by the depressing operation, and the depressing force detection unit 101 outputs the detection value D1 corresponding to the received sensor signal D0.

In step ST22, the memory effect correction unit 203 judges the presence/absence of the release operation of the depressing operation as a touch operation by the user. When there is no release operation by the user, the memory effect correction unit 203 repeatedly makes the judgment on the presence/absence of the release operation.

When there is a release operation by the user (time T21 in FIG. 16 which will be described later), the process advances to step ST23 and the memory effect correction unit 203 executes a correction process for reducing the influence of the memory effect at the time of the release operation.

Figure 16:
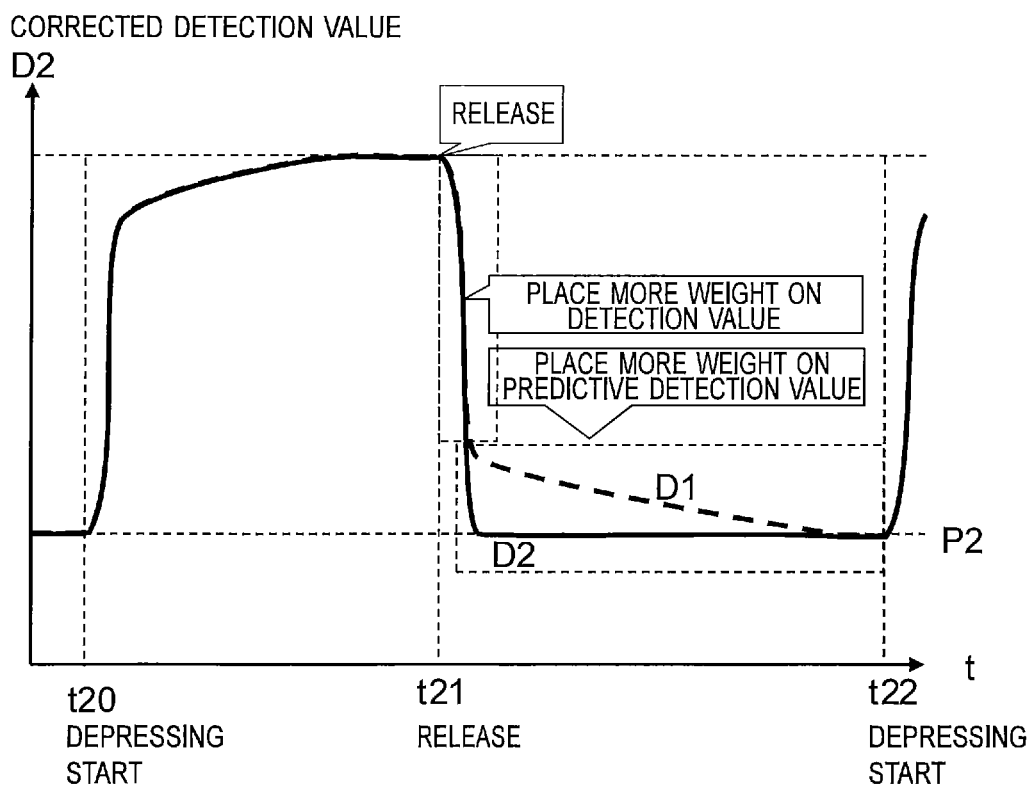
FIG. 16 is a graph showing the corrected detection value outputted from a memory effect correction unit when the depressing operation on the operation surface of the touch panel of the touch panel device according to the second embodiment is performed and thereafter the release operation is performed.

FIG. 16 is a graph showing the corrected detection value D2 outputted from the memory effect correction unit 203 when the depressing operation on the operation surface 21 of the touch panel 20 of the touch panel device 2 according to the second embodiment is performed and thereafter the release operation is performed. The operation of the memory effect correction unit 203 is similar to the operation of the memory effect correction unit 103 in the first embodiment. However, the final predictive detection value P is a minimum value P2 that the predictive detection value finally reaches.

As described above, by using the touch panel device 2, the memory effect correction method and the memory effect correction program according to the second embodiment, the accuracy of the corrected detection value D2 at the time of the release operation after the depressing operation can be increased. Further, the operability can be increased in operations accompanied by the release operation.

(3) Third Embodiment

A touch panel device 3 according to a third embodiment has a function of displaying an indicator image on the display device 50 in a period from the start of the depressing operation on the operation surface 21 of the touch panel 20 to a time of returning to the state before the depressing operation by performing the release operation. The user can learn that the depressing operation is being performed without fail by visually checking the indicator image displayed on the display device 50. However, when the indicator image does not disappear immediately after the release operation due to the influence of the memory effect, the user cannot perform the next operation until the indicator image disappears.

Therefore, the touch panel device 3 according to the third embodiment has a function of executing a process for reducing the influence of the memory effect at the time of the release operation and immediately ending the display of the indicator image at the time of the release operation. The operability of the touch panel device 3 increases since the display of the indicator image in a memory effect period, in which the influence of the memory effect at the time of the release operation appears in the detection value D1, ends at the time of the end of the memory effect period.

Further, when the depressing operation is performed in the memory effect period in which the influence of the memory effect appears in the detection value D1, the touch panel device 3 notifies the user that it is in the memory effect period by means of a warning display on the display device 50, warning sound, or the like. When the depressing operation is performed in the memory effect period, the touch panel device 3 is capable of letting the user recognize that the depressing operation was performed in the memory effect period.

Figure 17:
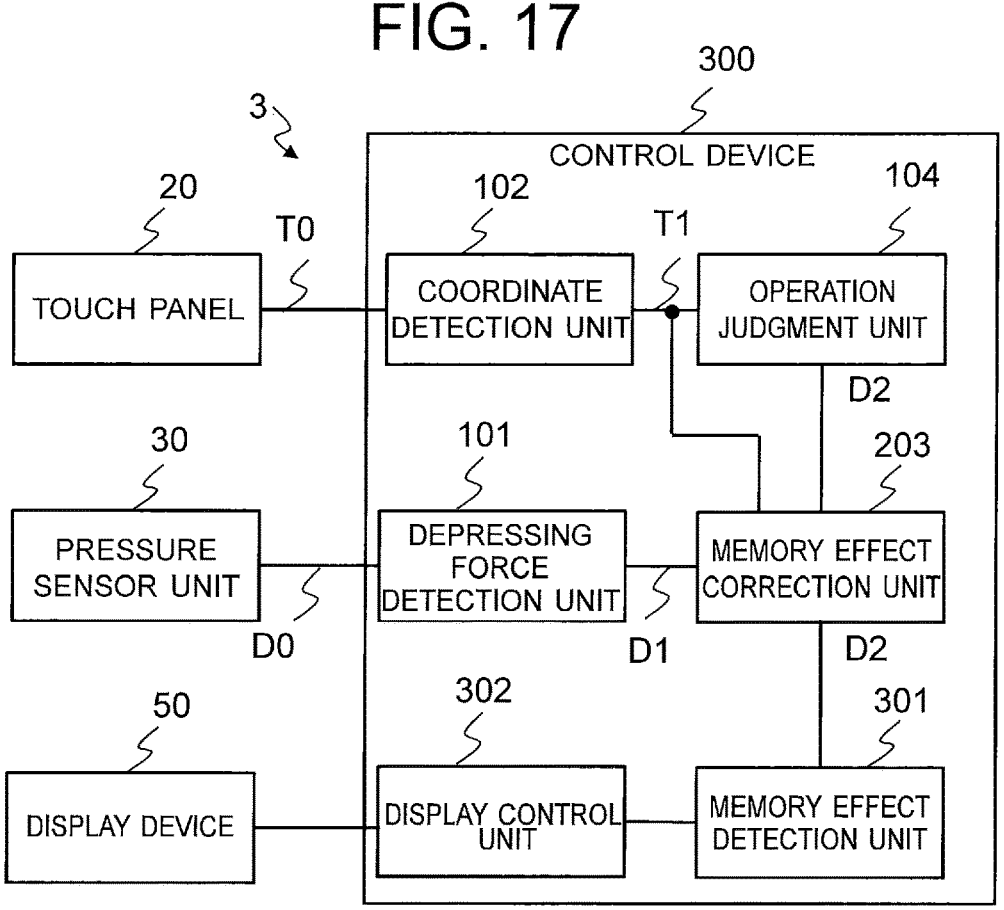
FIG. 17 is a functional block diagram schematically showing the configuration of a touch panel device according to a third embodiment of the present disclosure.

FIG. 17 is a functional block diagram schematically showing the configuration of the touch panel device 3 according to the third embodiment. In FIG. 17, each component identical or corresponding to a component shown in FIG. 14 is assigned the same reference character as in FIG. 14. The touch panel device 3 according to the third embodiment differs from the touch panel device 2 according to the second embodiment in that a control device 300 includes a memory effect detection unit 301 and a display control unit 302. The whole or part of the control device 300 may be formed with processing circuitry. Except for these features, the third embodiment is the same as the second embodiment.

The depressing force detection unit 101 acquires the sensor signal D0 outputted from the pressure sensor unit 30. The coordinate detection unit 102 detects the contact and the releasing of the finger with/from the operation surface 21 of the touch panel 20. The memory effect correction unit 203 acquires the information indicating the release operation, indicating that the finger has been released from the coordinate detection unit 102 and acquires the depressing force detection value D1 from the depressing force detection unit 101, and corrects the depressing force detection value in the memory effect period at the time of the release operation by performing a process similar to that in the second embodiment.

The memory effect detection unit 301 acquires the reliability of the predictive detection value, the time constant t in the predictive detection value function f(t), the corrected detection value D2, and so forth from the memory effect correction unit 203. The memory effect detection unit 301 provides the display control unit 302 with a signal indicating the memory effect period as the period in which the influence of the memory effect exists (referred to also as a "memory effect period signal") and a depressing operation signal as a signal indicating that a depressing operation occurred in the memory effect period (referred to also as a "memory effect period depression signal"). The memory effect detection unit 301 switches the ON/OFF of the memory effect period signal provided to the display control unit 302 and the ON/OFF of the memory effect period depression signal provided to the display control unit 302 based on the reliability of the predictive detection value, the time constant τ in the predictive detection value function f(t) and the corrected detection value D2.

The display control unit 302 controls the display/non-display of the indicator image based on the ON/OFF of the memory effect period signal and the ON/OFF of the memory effect period depression signal.

Figure 18:
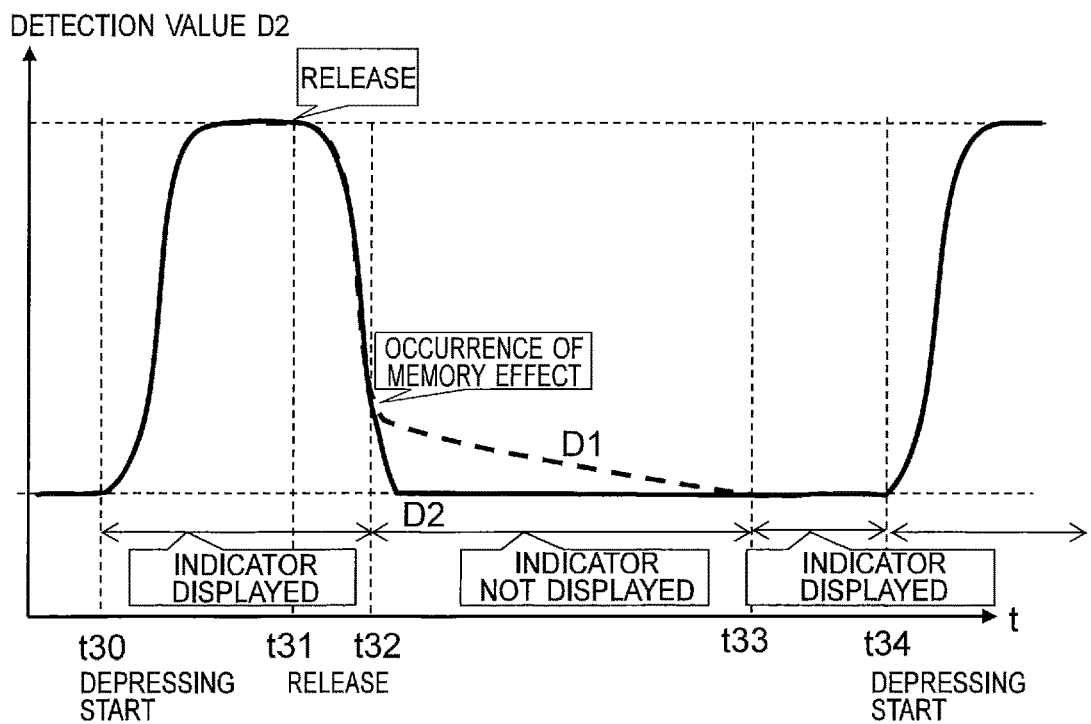
FIG. 18 is a graph showing the corrected detection value outputted from the memory effect correction unit when the depressing operation on the operation surface of the touch panel of the touch panel device according to the third embodiment is performed.

FIG. 18 is a graph showing the corrected detection value D2 outputted from the memory effect correction unit 203 when the depressing operation on the operation surface 21 of the touch panel 20 of the touch panel device 3 according to the third embodiment is performed (time t30) and thereafter the release operation is performed (time t31). As shown in FIG. 18, the indicator image is displayed in a period from the time t30 to time 32, the indicator image is not displayed in a period from the time t32 to time 33, and the indicator image is displayed in a period from the time t33 to time 34.

Figure 19:
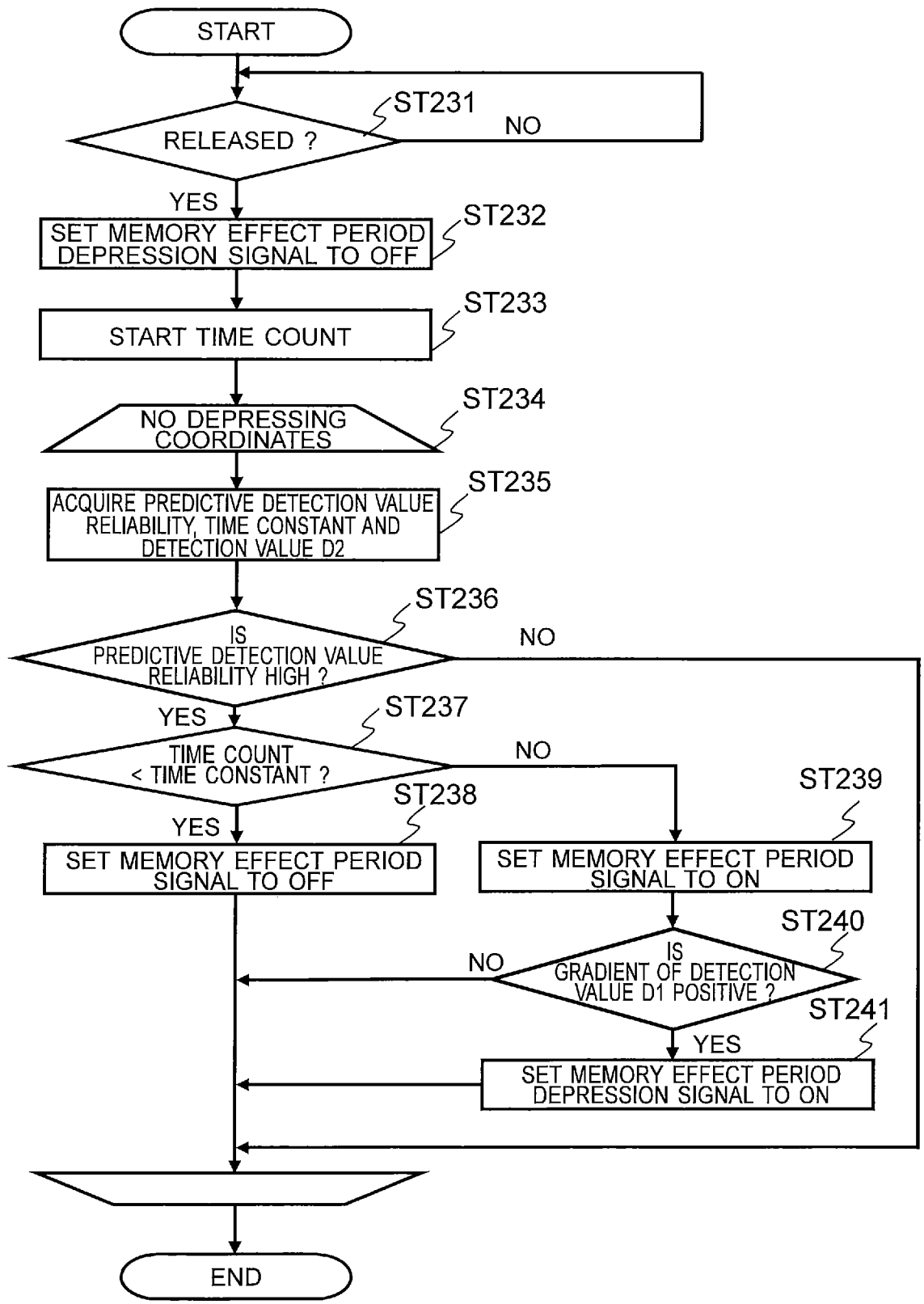
FIG. 19 is a flowchart showing a correction process for reducing the influence of the memory effect appearing in the detection value outputted from the depressing force detection unit when the depressing operation on the operation surface of the touch panel of the touch panel device according to the third embodiment is performed and thereafter the release operation is performed.

FIG. 19 is a flowchart showing a correction process for reducing the influence of the memory effect appearing in the detection value D1 outputted from the depressing force detection unit 101 when the depressing operation on the operation surface 21 of the touch panel 20 of the touch panel device 3 according to the third embodiment is performed and thereafter the release operation is performed.

In step ST231, the memory effect detection unit 301 judges whether the release operation has been performed or not based on information provided from the memory effect correction unit 203. When the release operation has not been performed, the memory effect detection unit 301 repeatedly performs the detection of the presence/absence of the release operation.

When the release operation has been performed, the process advances from the step ST231 to step ST232 and the memory effect detection unit 301 sets the memory effect period depression signal to OFF.

In the next step ST233, the memory effect detection unit 301 starts a time count.

In the next step ST234, the memory effect detection unit 301 executes a loop process in a period in which there is no coordinate information indicating the position of the depressing operation (i.e., no depressing coordinate information), that is, in a period of releasing.

In step ST235, the memory effect detection unit 301 acquires the reliability of the predictive detection value, the time constant τ and the corrected detection value D2 from the memory effect correction unit 203.

In step ST236, the memory effect detection unit 301 judges whether or not the reliability of the predictive detection value is high. When the reliability of the predictive detection value is low, the process returns to the step ST235.

When the reliability of the predictive detection value is high, the process advances from the step ST236 to step ST237 and the memory effect detection unit 301 judges whether or not the time count is less than the time constant τ.

When the time count is less than the time constant τ, the process advances from the step ST237 to step ST238 and the memory effect detection unit 301 sets the memory effect period signal to OFF to indicate that no memory effect has occurred.

When the time count is greater than or equal to the time constant τ, the process advances from the step ST237 to step ST239 and the memory effect detection unit 301 sets the memory effect period signal to ON to indicate that the memory effect has occurred.

In the next step ST240, the memory effect detection unit 301 judges whether the gradient of the depressing force detection value D1 is positive or not. When the gradient of the depressing force detection value D1 is positive, the memory effect detection unit 301 judges that the depressing operation has been performed in the memory effect period and sets the memory effect period depression signal to ON in step ST241.

When the gradient of the depressing force detection value is not positive, the memory effect detection unit 301 judges that there is no depressing operation.

FIGS. 20A and 20B are diagrams showing an example of the indicator image displayed on the display device 50 in superimposition with the operation surface 21 of the touch panel 20 of the touch panel device 3 according to the third embodiment. FIG. 21 is a diagram showing details of the indicator image.

As described above, by using the touch panel device 3, the memory effect correction method and the memory effect correction program according to the third embodiment, the display of the indicator image in the memory effect period at the time of the release operation is ended, and thus the next operation can be performed immediately. Accordingly, the operability increases.

Further, by using the touch panel device 3, the memory effect correction method and the memory effect correction program according to the third embodiment, when the depressing operation is performed in the memory effect period, it is possible to let the user recognize that the depressing operation has been performed appropriately even if the indicator image is not displayed.

(4) Fourth Embodiment

The description in the first to third embodiments has been given of cases where the time constant τ in the predictive detection value function f(t) is constant. However, there are cases where the temperature of the touch panel device changes due to heating of the touch panel device or influence of the temperature of the use environment or the like and the time constant τ fluctuates consequently. In such cases, the time constant τ in the depressing force detection value fluctuates, and thus it becomes impossible to accurately calculate the predictive detection value for the depressing force detection value from the predictive detection value function f(t). Therefore, a touch panel device 4 according to a fourth embodiment corrects the time constant τ of the predictive detection value function f(t) by calculating a fluctuation amount of the time constant τ based on a detection value of a temperature sensor.

Figure 22:
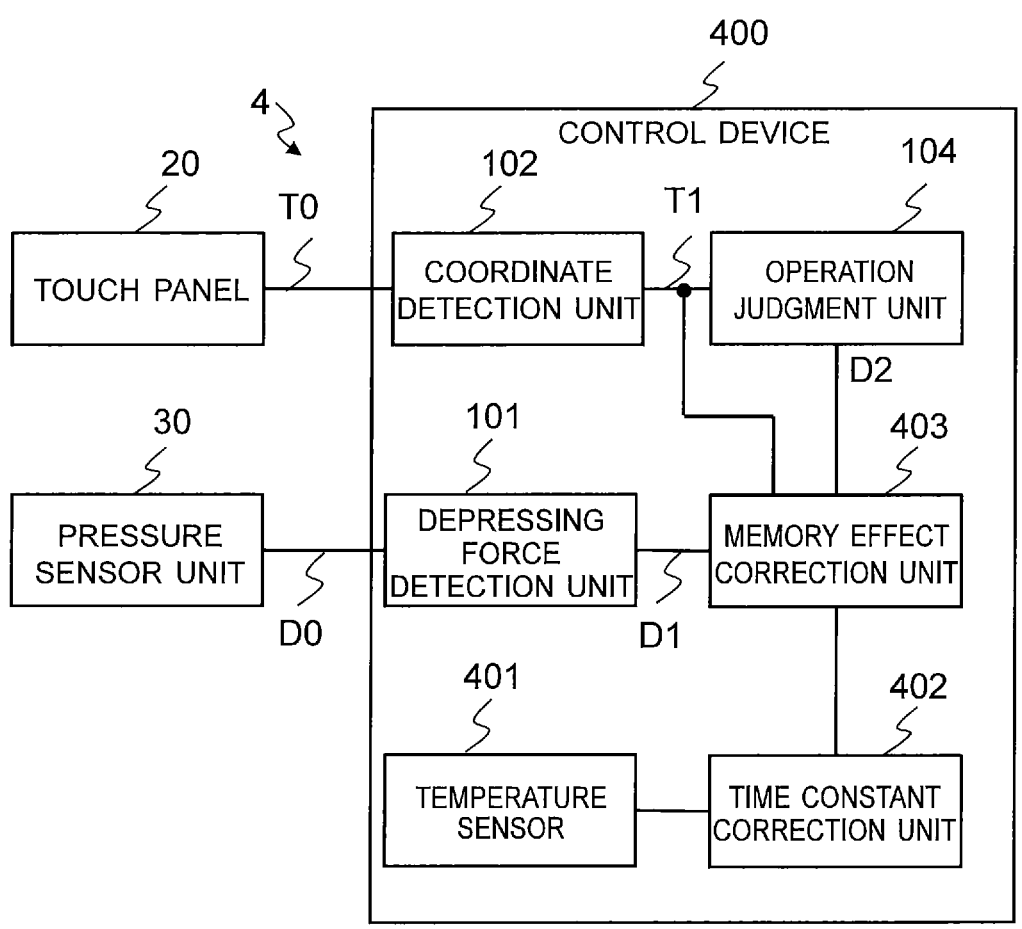
FIG. 22 is a functional block diagram schematically showing the configuration of a touch panel device according to a fourth embodiment of the present disclosure.

FIG. 22 is a functional block diagram schematically showing the configuration of the touch panel device 4 according to the fourth embodiment. In FIG. 22, each component identical or corresponding to a component shown in FIG. 14 is assigned the same reference character as in FIG. 14. The touch panel device 4 according to the fourth embodiment differs from the touch panel device 2 according to the second embodiment in that a control device 400 includes a temperature sensor 401 and a time constant correction unit 402. The whole or part of the control device 400 may be formed with processing circuitry. The touch panel device 4 according to the fourth embodiment differs from the touch panel device 2 according to the second embodiment in that a memory effect correction unit 403 executes a correction process by using the time constant determined by the time constant correction unit 402. Except for the above-described features, the fourth embodiment is the same as the second embodiment. Incidentally, the temperature sensor 401 may also be placed outside the control device 400. Further, it is also possible for the time constant correction unit 402 to acquire the temperature of the environment in which the touch panel device 4 is placed from an external temperature detector.

In the touch panel device 4 according to the fourth embodiment, the depressing force detection unit 101 outputs the depressing force detection value D1. The coordinate detection unit 102 detects the contact and the releasing of a conductor such as a finger with/from the operation surface 21 of the touch panel 20. The memory effect correction unit 403 acquires information indicating the depressing operation and the release operation from the coordinate detection unit 102, acquires the detection value D1 from the depressing force detection unit 101, and acquires the corrected time constant from the time constant correction unit 402. The time constant correction unit 402 acquires the temperature or a temperature fluctuation amount from the temperature sensor 401 and corrects the time constant of the predictive detection value function f(t) based on the acquired temperature or temperature fluctuation amount. The time constant correction unit 402 provides the memory effect correction unit 403 with the corrected time constant. The memory effect correction unit 403 executes the detection value D1 correction process by the same method as in any one of the first to third embodiments by using the time constant corrected based on the temperature.

As described above, by using the touch panel device 4, the memory effect correction method and the memory effect correction program according to the fourth embodiment, even when the temperature of the device or the environmental temperature fluctuates, the predictive detection value can be obtained accurately by the correction of the time constant τ of the predictive detection value function f(t). Accordingly, the accuracy of the corrected detection value D2 at the time of the depressing operation can be increased.

(5) Fifth Embodiment

In the touch panel devices 1 to 4 according to the first to fourth embodiments, there are cases where a property of a constituent material of the pressure sensors 30a to 30d or the support part 31 as the elastic material supporting the touch panel 20 changes due to the secular change, i.e., deterioration over time. Thus, there are cases where the value of the sensor signal D0 changes compared to the value at the time of shipment. In such cases, the difference between the predictive detection value obtained from the predictive detection value function f(t) and the depressing force detection value D1 increases and the memory effect correction process cannot be executed appropriately.

Therefore, a touch panel device 5 according to a fifth embodiment calculates a secular change amount indicating the degree of the secular change based on the number of times of the depressing operation and the operating time since the time of shipment and executes a time constant correction process of changing the time constant τ of the predictive detection value function f(t) by a change amount corresponding to the secular change amount. This can prevent the increase in the difference between the predictive detection value calculated by using the predictive detection value function f(t) and the depressing force detection value D1. Thus, even after the occurrence of the secular change, the touch panel device 5 according to the fifth embodiment is capable of obtaining an appropriate corrected detection value D2 by correcting the detection value D1.

Figure 23:
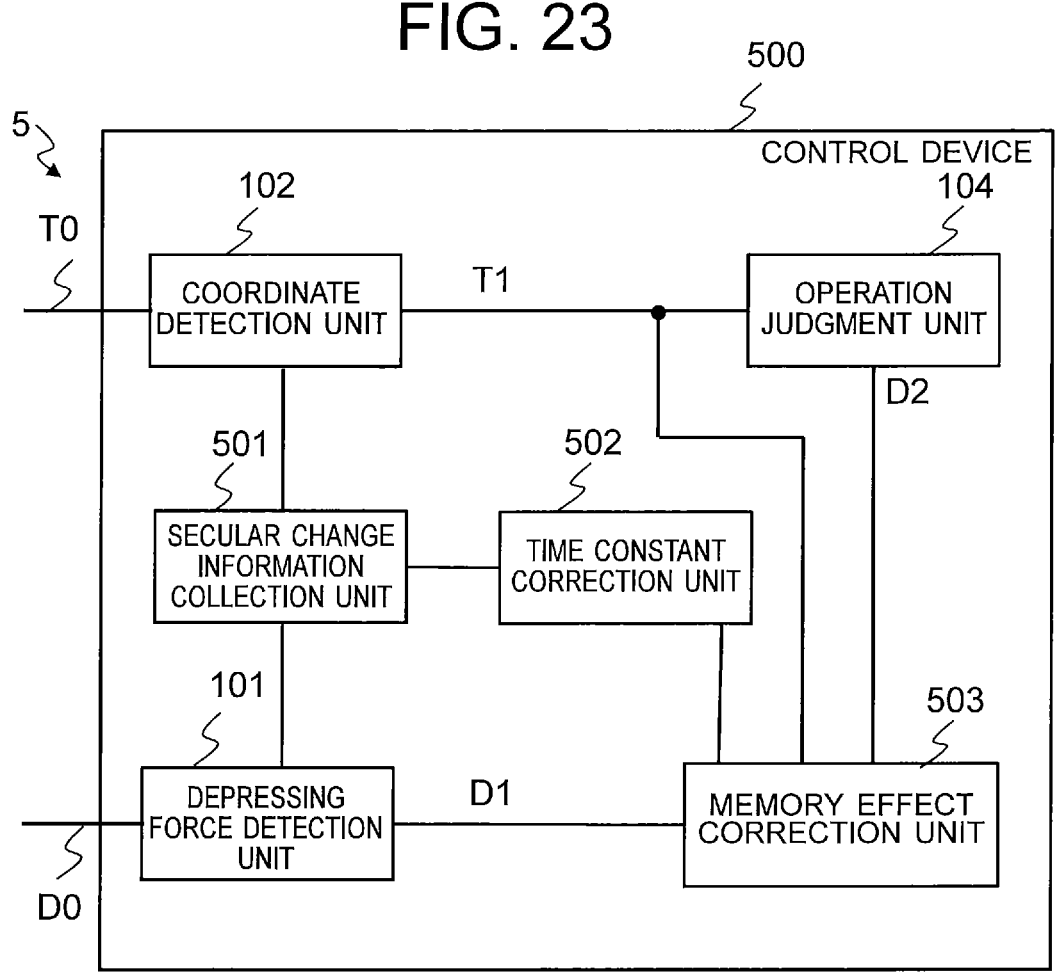
FIG. 23 is a functional block diagram schematically showing the configuration of a touch panel device according to a fifth embodiment of the present disclosure.

FIG. 23 is a functional block diagram schematically showing the configuration of the touch panel device 5 according to the fifth embodiment. In FIG. 23, each component identical or corresponding to a component shown in FIG. 14 is assigned the same reference character as in FIG. 14. The touch panel device 5 according to the fifth embodiment differs from the touch panel device 2 according to the second embodiment in that a control device 500 includes a secular change information collection unit 501 and a time constant correction unit 502. The whole or part of the control device 500 may be formed with processing circuitry. Further, the touch panel device 5 according to the fifth embodiment differs from the touch panel device 2 according to the second embodiment in that a memory effect correction unit 503 executes a correction process by using the time constant determined by the time constant correction unit 502. Except for the above-described features, the fifth embodiment is the same as the second embodiment.

In the touch panel device 5 according to the fifth embodiment, the depressing force detection unit 101 outputs the depressing force detection value D1. The coordinate detection unit 102 detects the contact and the releasing of a conductor such as a finger with/from the operation surface 21 of the touch panel 20. The memory effect correction unit 503 acquires the information indicating the depressing operation and the release operation from the coordinate detection unit 102, acquires the detection value D1 from the depressing force detection unit 101, and acquires the corrected time constant from the time constant correction unit 502. The time constant correction unit 502 acquires secular change information regarding the secular change, such as the operating time, the number of times of the depressing operation, or both of them, from the secular change information collection unit 501 and corrects the time constant of the predictive detection value function f(t) based on the acquired secular change information. The time constant correction unit 502 provides the memory effect correction unit 503 with the corrected time constant. The memory effect correction unit 503 executes the detection value D1 correction process by the same method as in any one of the first to fourth embodiments by using the corrected time constant.

As described above, by using the touch panel device 5, the memory effect correction method and the memory effect correction program according to the fifth embodiment, the time constant τ of the predictive detection value function f(t) that has changed due to the secular change of the device is corrected, and thus the predictive detection value can be obtained accurately. Accordingly, the accuracy of the corrected detection value D2 at the time of the depressing operation can be increased even after the occurrence of the secular change.

(6) Sixth Embodiment

In the predictive detection value function f(t) used in each of the touch panel devices 1 to 3 according to the first to third embodiments, the time constant τ is constant. However, there is a possibility that the time constant τ changes due to a temperature change, an aging deterioration or the like of a property of the elastic material supporting the touch panel 20. When the time constant τ has changed, the absolute value |E1−D1| of the difference between the predictive detection value E1 obtained by using a previously stored predictive detection value function f(t) and the depressing force detection value D1 is expected to increase.

Figure 24:
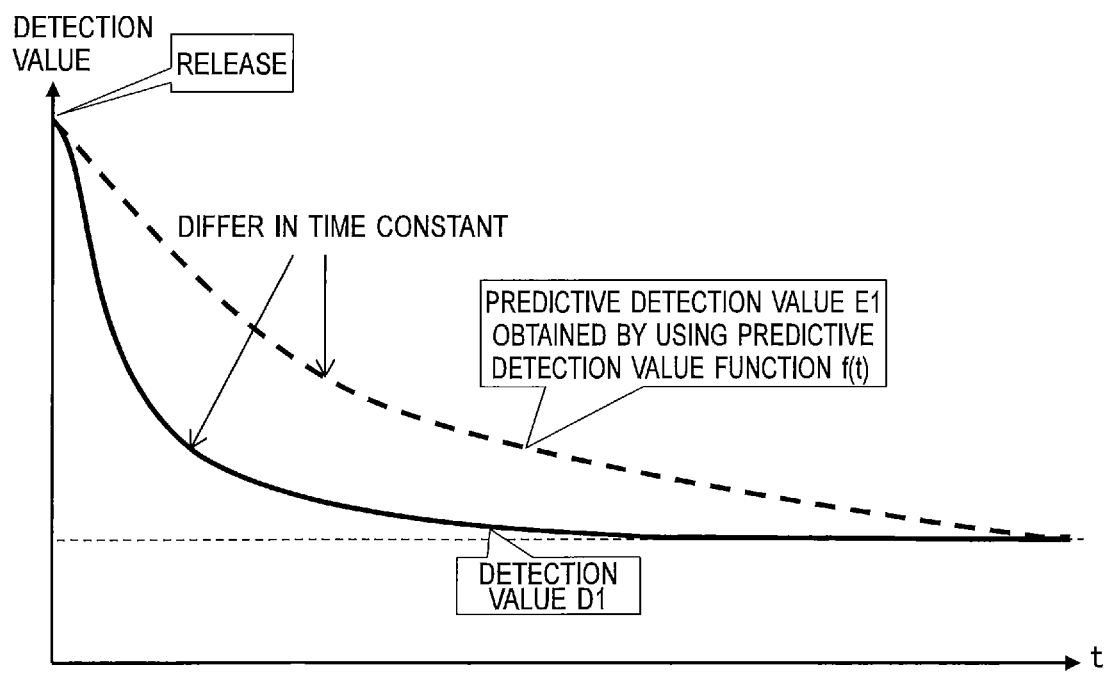
FIG. 24 is a diagram showing a graph (indicated by a broken line) showing a predictive detection value obtained by using a predictive detection value function having the time constant that has changed due to a temperature change, aging deterioration or the like and a graph (indicated by a solid line) showing the detection value as a present observation value outputted from the depressing force detection unit.

FIG. 24 is a diagram showing a graph (indicated by a broken line) showing the predictive detection value E1 obtained by using a predictive detection value function f(t) having the time constant that has changed due to the temperature change, the aging deterioration or the like and a graph (indicated by a solid line) showing the detection value D1 as the present observation value outputted from the depressing force detection unit 101. FIG. 24 shows a case where the absolute value |E1−D1| of the difference between the predictive detection value E1 obtained by using the previously stored predictive detection value function f(t) and the depressing force detection value D1 has increased.

Figure 25A:
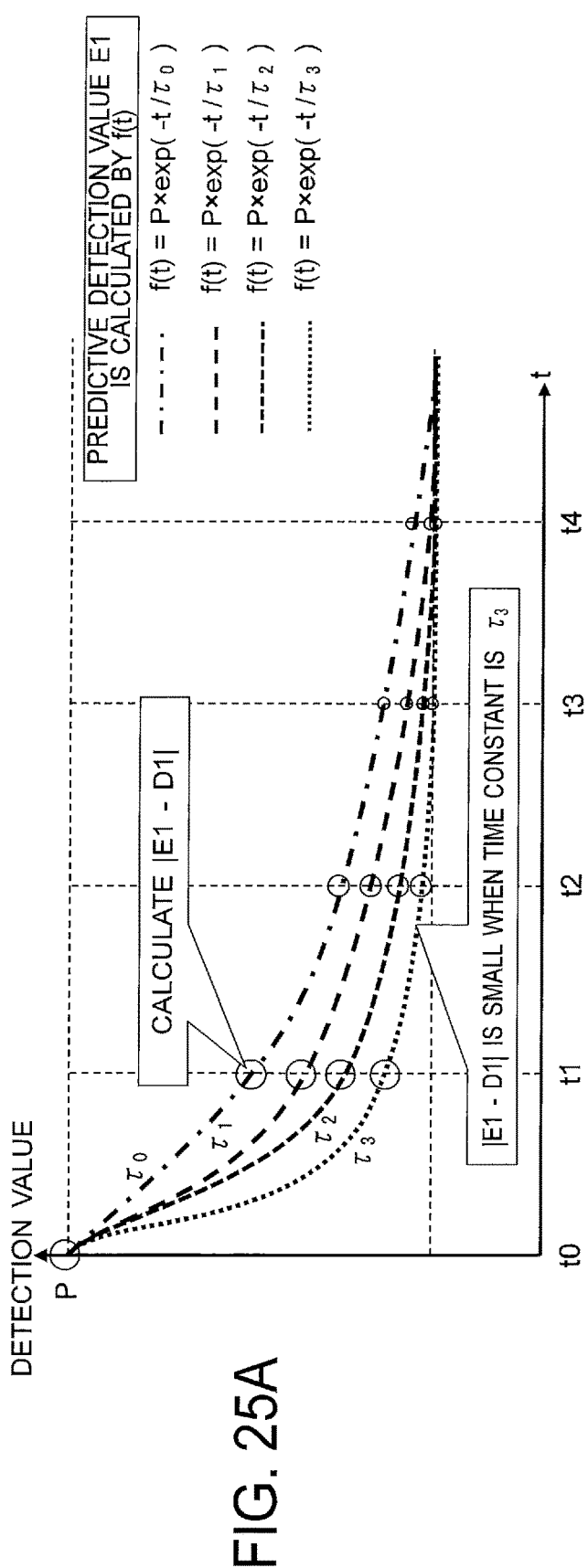
FIG. 25A is a graph showing a plurality of predictive detection value functions differing from each other in the time constant.
Figure 25B:
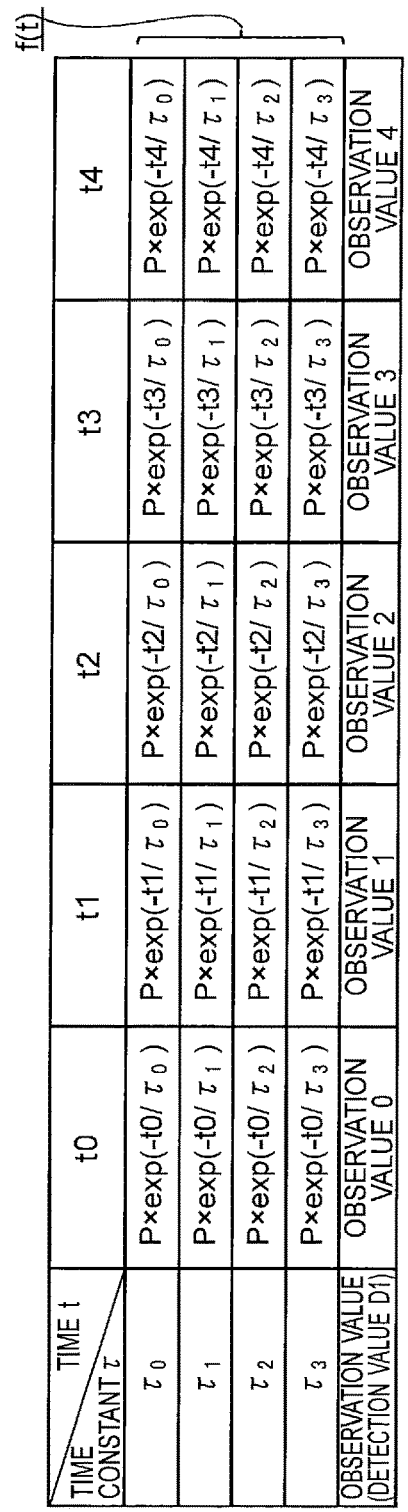
FIG. 25B is a diagram showing detection values as observation values of the predictive detection value functions differing from each other in the time constant at each time in a tabular form.

FIG. 25A is a graph showing a plurality of predictive detection value functions f(t) differing from each other in the time constant, and FIG. 25B is a diagram showing detection values as observation values of the predictive detection value functions f(t) differing from each other in the time constant at each time t0-t4 in a tabular form. As shown in FIGS. 25A and 25B, t represents an elapsed time since the time of the release operation of separating a conductor such as a finger from the operation surface 21, and f(t) represents a predictive detection value function having one of $\tau_0, \tau_1, \tau_2, \tau_3, \ldots$ as the time constant. A touch panel device 6 according to a sixth embodiment has previously stored a plurality of predictive detection value functions f(t) having $\tau_0, \tau_1, \tau_2, \tau_3, \ldots$ as the time constants, calculates a plurality of predictive detection values E1 in regard to each time by using the plurality of predictive detection value functions f(t), and determines a predictive detection value function having a time constant capable of minimizing the absolute value |E1−D1| of the difference between the depressing force detection value D1 and the predictive detection value E1 at each time. Further, the touch panel device 6 executes the memory effect correction process by the same method as in any one of the above-described first to third embodiments by using the determined predictive detection value f(t).

FIGS. 26A to 26D are diagrams showing a method of determining the time constant ti that reduces the absolute value |E1−D1| of the difference between the present predictive detection value E1 and the present detection value D1. The example shown in FIGS. 26A to 26D and FIGS. 25A and 25B shows a case where |E1−D1| becomes the smallest when the time constant is $\tau_3$. Therefore, the touch panel device 6 executes the memory effect correction process by the same method as in any one of the above-described first to third embodiments by using the predictive detection value f(t) employing the time constant $\tau_3$.

Figure 27:
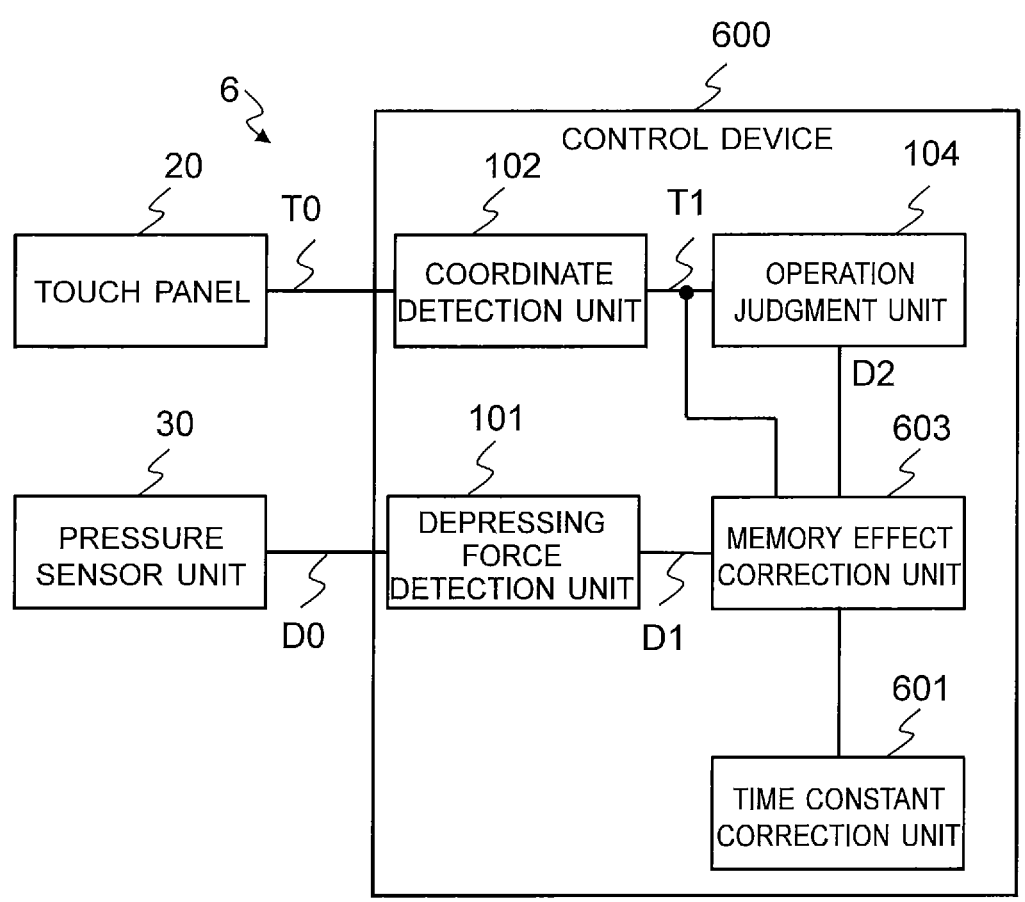
FIG. 27 is a functional block diagram schematically showing the configuration of a touch panel device according to a sixth embodiment.

FIG. 27 is a functional block diagram schematically showing the configuration of the touch panel device 6 according to the sixth embodiment. In FIG. 27, each component identical or corresponding to a component shown in FIG. 14 is assigned the same reference character as in FIG. 14. The touch panel device 6 according to the sixth embodiment differs from the touch panel device 2 according to the second embodiment in that a control device 600 of the touch panel device 6 includes a time constant correction unit 601. The whole or part of the control device 600 may be formed with processing circuitry.

In the touch panel device 6 according to the sixth embodiment, the depressing force detection unit 101 outputs the depressing force detection value D1. The coordinate detection unit 102 detects the contact and the releasing of a conductor such as a finger with/from the operation surface 21 of the touch panel 20. A memory effect correction unit 603 acquires the information indicating the depressing operation and the release operation from the coordinate detection unit 102, acquires the detection value D1 from the depressing force detection unit 101, and acquires the corrected time constant from the time constant correction unit 601. The memory effect correction unit 603 executes the memory effect correction process by the same method as in any one of the first to third embodiments by using the predictive detection value f(t) having the corrected time constant.

As described above, by using the touch panel device 6, the memory effect correction method and the memory effect correction program according to the sixth embodiment, even when the time constant τ has changed due to the temperature change, the secular change or the like, the time constant τ is corrected at the time of the release operation, and thus the absolute value |E1−D1| of the difference between the depressing force detection value D1 and the predictive detection value E1 becomes small. Therefore, the reliability of the predictive detection value f(t) having the corrected time constant increases and it becomes possible to place more weight on the final predictive detection value P, that is, to set the weight coefficient $W_P$ of the final predictive detection value P at a large value. Accordingly, the predictive detection value can be obtained accurately and the accuracy of the corrected detection value D2 at the time of the release operation can be increased.

Incidentally, it is also possible for the touch panel device 6 according to the sixth embodiment to store depressing force detection values D1 detected after the release operation, normalize the depressing force detection values D1 by using the depressing force detection value P (=P0) at the time of the release operation, and store data, in which each normalized value is associated with the time until the detection value D1 returns to the original value, as f(t)_base. In this case, at times of subsequent depressing operations, the touch panel device 6 can execute the memory effect correction process by using the f(t)_base.

Specifically, the depressing force detection value as the value of the detection value D1 in FIG. 24 acquired at each time is P0, P1, . . . , PN (N: positive integer). The time constant correction unit 601 obtains a function f(t) indicating an approximated curve connecting the detection values P0, P1, . . . , PN. Subsequently, the time constant correction unit 601 obtains a normalized function f(t)_base by dividing the function f(t) by the depressing force detection value P0 at the time of the release operation. The memory effect correction unit 603 stores information indicating this normalized function f(t)_base. The memory effect correction unit 603 uses the stored information indicating the normalized function f(t)_base at times of subsequent calculations of the depressing force.

It is also possible for the time constant correction unit 601 to store a plurality of functions f(t), obtained by multiplying the normalized function f(t)_base by a plurality of depressing force detection values P0, P1, . . . , PN (N: positive integer), as the information indicating the normalized function f(t)_base. The memory effect correction unit 603 is capable of executing a memory effect correction process similar to that in the first embodiment by using a function f(t) having the corrected time constant. When the time constant has changed, even for cases where the predictive detection value function cannot be described with f(t)=P(1−exp(−t/τ)) due to a factor other than a change in viscosity of the elastic material supporting the touch panel 20, the touch panel device 6 is capable of appropriately correcting the memory effect by dynamically obtaining the predictive detection value function f(t).

In a modification of the sixth embodiment, the touch panel device 6 may store depressing force detection values D1 detected after the release operation, normalize the depressing force detection values D1 by using the depressing force detection value P at the time of the release operation, and store data, in which each normalized value is associated with the time until the detection value D1 returns to the original value, as the f(t)_base. The touch panel device 6 according to the modification is capable of executing the memory effect correction process by using the f(t)_base at times of subsequent depressing operations. Namely, the memory effect correction unit 603 of the touch panel device 6 according to the modification stores depressing force detection values D1 detected after the release operation as the time of stopping the application of the depressing force, normalizes the depressing force detection values D1 by using the depressing force detection value at the time of the release operation, and stores a plurality of pieces of correction process data, obtained by associating each value obtained by the normalization with the time until the depressing force detection value D1 returns to the original value, as a plurality of pieces of predictive detection value information as shown in FIG. 25B. At times of subsequent depressing operations as touch operations performed on the operation surface, the memory effect correction unit 603 executes the memory effect correction process by using the correction process data having a time constant that minimizes the absolute value of the difference (e.g., data shown in FIG. 26D) among the plurality of pieces of correction process data as the selected predictive detection value information. The touch panel device 6 according to the modification having such a configuration is capable of updating the time constant τ of f(t)=P×(1−exp(−t/τ)) even when the time constant has changed, and thus is capable of executing correction that is robust to environmental variation.

(7) Modification

It is possible to appropriately combine the configurations of the touch panel devices 1 to 6 in the above first to sixth embodiments.

DESCRIPTION OF REFERENCE CHARACTERS

1-6: touch panel device, 20: touch panel, 21: operation surface, 30: pressure sensor unit, 30*a*-30*d*: pressure sensor, 31: support part, 41: processor, 42: memory, 50: display device, 80: finger, 100, 200, 300, 400, 500, 600: control device, 101: depressing force detection unit, 102: coordinate detection unit, 103, 203, 403, 503, 603: memory effect correction unit, 104: operation judgment unit, 301: memory effect detection unit, 302: display control unit, 401: temperature sensor, 402, 502, 601: time constant correction unit, 501: secular change information collection unit.

What is claimed is:

1. A touch panel device that outputs a control signal corresponding to a touch operation performed on an operation surface of a touch panel, comprising:
  processing circuitry
    to generate coordinate information based on a signal outputted from the touch panel due to the touch operation; and
    to output a detection value based on depressing force applied to the operation surface of the touch panel by the touch operation,
  wherein the processing circuitry
  previously stores a plurality of pieces of predictive detection value information each indicating a predictive detection value as a predictive value of the detection value,
  selects a piece of predictive detection value information from the plurality of pieces of predictive detection value information based on a gradient of the detection value,
  obtains a final predictive detection value that the predictive detection value finally reaches by using the selected predictive detection value information,
  obtains a present predictive detection value by using the selected predictive detection value information, and
  executes a correction process of reducing influence of a memory effect by bringing a present detection value close to the final predictive detection value when an absolute value of a difference between the present predictive detection value and the present detection value is less than or equal to a predetermined threshold value.

2. The touch panel device according to claim 1, wherein when the absolute value of the difference is less than or equal to the threshold value, the processing circuitry generates a corrected detection value by decreasing a value of a first weight coefficient corresponding to reliability of the detection value, increasing a value of a second weight coefficient corresponding to reliability of the final predictive detection value, and performing weighted addition of the detection value and the final predictive detection value by using the first weight coefficient and the second weight coefficient.

3. The touch panel device according to claim 1, wherein when the absolute value of the difference is greater than the threshold value, the processing circuitry generates a corrected detection value by increasing a value of a first weight coefficient corresponding to reliability of the detection value, decreasing a value of a second weight coefficient corresponding to reliability of the final predictive detection value, and performing weighted addition of the detection value and the final predictive detection value by using the first weight coefficient and the second weight coefficient.

4. The touch panel device according to claim 1, wherein the predictive detection value information is a predictive detection value function that indicates time variation of the predictive detection value.

5. The touch panel device according to claim 4, wherein $$f(t)=P\times(1-\exp(-t/\tau))$$

holds where t represents an elapsed time since a time point of starting a depressing operation as the touch operation, f(t) represents the predictive detection value function, $\tau$ represents a time constant, and P represents the final predictive detection value as a final value of the predictive detection value of the depressing force detection value.

6. The touch panel device according to claim 1, wherein the predictive detection value information is correspondence relationship information indicating a relationship between an elapsed time since a time when the depressing force changed and the predictive detection value.

7. The touch panel device according to claim 6, wherein
when the depressing force changed is when the application of the depressing force was started or when the depressing force was increased, and
the final predictive detection value is a maximum value that the predictive detection value finally reaches.

8. The touch panel device according to claim 6, wherein
when the depressing force changed is at a time of a release operation of stopping the application of the depressing force, and
the final predictive detection value is a minimum value that the predictive detection value finally reaches.

9. The touch panel device according to claim 1, wherein the processing circuitry
makes a display device display an image; and
obtains a memory effect period signal indicating a memory effect period in which the influence of the memory effect exists in the detection value and a depressing operation signal as a signal indicating that a depressing operation occurred in the memory effect period,
wherein the processing circuitry makes the display device display information indicating whether it is in the memory effect period or not and information indicating that the depressing operation occurred in the memory effect period.

10. The touch panel device according to claim 1, further comprising a temperature sensor,
wherein the processing circuitry corrects a time constant used in the predictive detection value information based on temperature detected by the temperature sensor.

11. The touch panel device according to claim 1, wherein the processing circuitry
collects one or more items of information among a cumulative number of times of a depressing operation, a cumulative operating time of the touch panel device, and the detection value; and
corrects a time constant used in the predictive detection value information based on the one or more items of information.

12. The touch panel device according to claim 1, wherein the processing circuitry
obtains a function based on the depressing force at each time detected after a release operation as a time of stopping the application of the depressing force, obtains a normalized function by dividing the function by the depressing force detection value at the time of the release operation, and stores information indicating the normalized function, and
executes the memory effect correction process by using the information indicating the normalized function.

13. The touch panel device according to claim 1, wherein the processing circuitry
stores depressing force detection values detected after a release operation as a time of stopping the application of the depressing force,
normalizes the depressing force detection values by using the depressing force detection value at the time of the release operation,
stores a plurality of pieces of correction process data, obtained by associating each value obtained by the normalization with a time until the depressing force detection value returns to an original value, as the plurality of pieces of predictive detection value information, and
executes the memory effect correction process by using correction process data having a time constant that minimizes the absolute value of the difference, among the plurality of pieces of correction process data, as the selected predictive detection value information at times of subsequent depressing operations as touch operations performed on the operation surface.

14. A memory effect correction method comprising:
generating coordinate information based on a signal outputted from a touch panel due to a touch operation;
outputting a detection value based on depressing force applied to an operation surface of the touch panel by the touch operation;
previously storing a plurality of pieces of predictive detection value information each indicating a predictive detection value as a predictive value of the detection value;
selecting a piece of predictive detection value information from the plurality of pieces of predictive detection value information based on a gradient of the detection value;
obtaining a final predictive detection value that the predictive detection value finally reaches by using the selected predictive detection value information;
obtaining a present predictive detection value by using the selected predictive detection value information; and
executing a correction process of reducing influence of a memory effect by bringing a present detection value based on the depressing force applied to the operation surface of the touch panel close to the final predictive detection value when an absolute value of a difference between the present predictive detection value and the present detection value is less than or equal to a predetermined threshold value.

15. A non-transitory computer-readable storage medium storing a memory effect correction program that causes a computer to execute:
- generating coordinate information based on a signal outputted from a touch panel due to a touch operation;
- outputting a detection value based on depressing force applied to an operation surface of the touch panel by the touch operation;
- previously storing a plurality of pieces of predictive detection value information each indicating a predictive detection value as a predictive value of the detection value;
- selecting a piece of predictive detection value information from the plurality of pieces of predictive detection value information based on a gradient of the detection value;
- obtaining a final predictive detection value that the predictive detection value finally reaches by using the selected predictive detection value information;
- obtaining a present predictive detection value by using the selected predictive detection value information; and
- executing a correction process of reducing influence of a memory effect by bringing a present detection value based on the depressing force applied to the operation surface of the touch panel close to the final predictive detection value when an absolute value of a difference between the present predictive detection value and the present detection value is less than or equal to a predetermined threshold value.

* * * * *